United States Patent
Chow et al.

(10) Patent No.: US 7,573,891 B1
(45) Date of Patent: Aug. 11, 2009

(54) HYBRID FIBER/CONDUCTOR INTEGRATED COMMUNICATION NETWORKS

(75) Inventors: Peter El Kwan Chow, Orlando, GA (US); Douglas R. Campbell, Orlando, FL (US); Joseph L. Lias, Mcdonough, GA (US); Steve Rogers, Warrenton, VA (US)

(73) Assignee: Optimal Innovations, Inc., Bridgetown (BB)

( * ) Notice: Subject to any disclaimer, the term of this patent is extended or adjusted under 35 U.S.C. 154(b) by 873 days.

(21) Appl. No.: 10/094,743

(22) Filed: Mar. 11, 2002

Related U.S. Application Data

(60) Provisional application No. 60/336,661, filed on Dec. 5, 2001.

(51) Int. Cl.
H04L 12/56 (2006.01)
H04J 3/22 (2006.01)

(52) U.S. Cl. .................................. 370/401; 370/466

(58) Field of Classification Search ................. 370/401, 370/406, 422, 424, 479, 480, 498, 465–467, 370/352, 400
See application file for complete search history.

(56) References Cited

U.S. PATENT DOCUMENTS

| | | | |
|---|---|---|---|
| 4,023,139 A | 5/1977 | Samburg | |
| 4,090,248 A | 5/1978 | Swanson et al. | |
| 4,168,491 A | 9/1979 | Phillips et al. | |
| 4,212,078 A | 7/1980 | Games et al. | |
| 4,298,860 A | 11/1981 | Norberg et al. | |
| 4,419,667 A | 12/1983 | Gurr et al. | |
| 5,864,284 A * | 1/1999 | Sanderson | 725/103 |
| 5,870,032 A | 2/1999 | Eslambolshi | |
| 5,911,119 A * | 6/1999 | Bartholomew et al. | 455/402 |
| 5,930,257 A | 7/1999 | Smith et al. | |
| 5,937,342 A * | 8/1999 | Kline | 455/402 |
| 6,058,479 A | 5/2000 | Sorhaug et al. | |
| 6,144,661 A | 11/2000 | Katsube et al. | |
| 6,222,845 B1 | 4/2001 | Shue et al. | |
| 6,278,357 B1 * | 8/2001 | Croushore et al. | 375/259 |
| 6,516,352 B1 | 2/2003 | Booth et al. | |
| 6,523,068 B1 * | 2/2003 | Beser et al. | 709/238 |
| 6,633,823 B2 | 10/2003 | Bartone et al. | |
| 6,636,124 B1 * | 10/2003 | Liu | 332/109 |

(Continued)

FOREIGN PATENT DOCUMENTS

EP 1471705 10/2004

OTHER PUBLICATIONS

U.S. Appl. No. 60/336,661, filed Dec. 5, 2001, Peter E. Chow, et al.

(Continued)

*Primary Examiner*—Aung S Moe
*Assistant Examiner*—Kerri M Rose
(74) *Attorney, Agent, or Firm*—Kilpatrick Stockton LLP

(57) ABSTRACT

Disclosed are systems and methods which provide communications to a subscriber level of a network using a hybrid communication network. Preferred embodiments of a hybrid communication network of the present invention provide communications using both fiber media and electrically conductive media. Preferred embodiments of the present invention bring fiber optic cables to a point just beyond the last transformer before a subscriber in the power grid. At a point on the subscriber side of the last transformer, e.g., a low voltage subscriber distribution point transformer, the communication signal is preferably coupled from the fiber optic cable of the preferred embodiment to the power transmission line.

47 Claims, 8 Drawing Sheets

U.S. PATENT DOCUMENTS

| | | | |
|---|---|---|---|
| 6,965,302 B2* | 11/2005 | Mollenkopf et al. | 370/475 |
| 2002/0011923 A1 | 1/2002 | Cunningham et al. | |
| 2002/0033416 A1 | 3/2002 | Gerszberg et al. | |
| 2002/0075814 A1 | 6/2002 | Desai et al. | |
| 2002/0097953 A1* | 7/2002 | Kline | 385/24 |
| 2002/0110310 A1* | 8/2002 | Kline | 385/15 |
| 2003/0044050 A1 | 3/2003 | Clark et al. | |
| 2004/0174851 A1* | 9/2004 | Zalitzky et al. | 370/338 |
| 2006/0221998 A1 | 10/2006 | Livet et al. | |

OTHER PUBLICATIONS

International Search Report & Written Opinion issued for PCT/IB2005/003048 dated Mar. 14, 2006.

International Search Report and the Written Opinion issued for PCT/IB2005/004168, dated Nov. 27, 2006.

Declaration of Roland Schoettle dated Jul. 21, 2008, 1 page.

\* cited by examiner

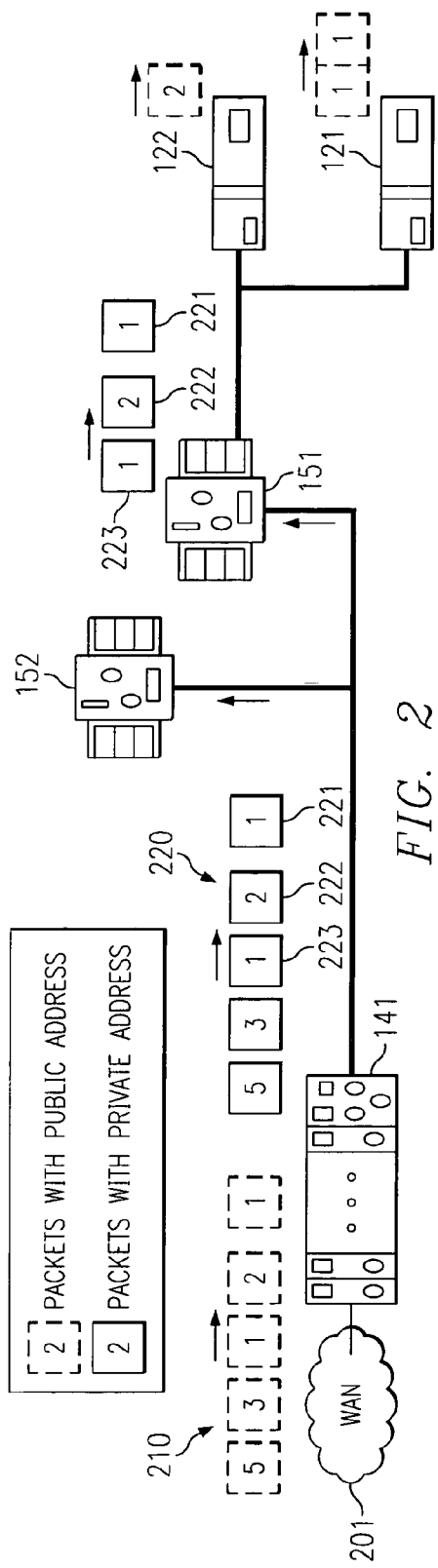
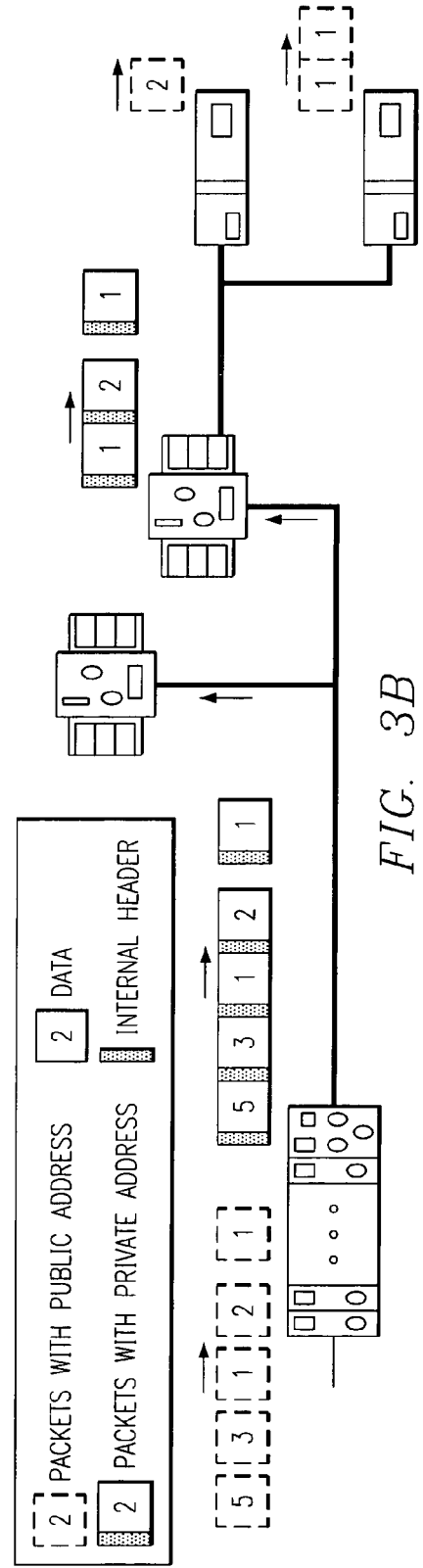
FIG. 2
FIG. 3A
FIG. 3B

HYBRID FIBER/CONDUCTOR INTEGRATED COMMUNICATION NETWORKS

RELATED APPLICATIONS

The present application is related, and priority is hereby claimed, to co-pending and commonly assigned U.S. provisional patent application Ser. No. 60/336,661 entitled "Hybrid Fiber Power-Line Broadband Communication Networks," filed Dec. 5, 2001, the disclosure of which is hereby incorporated herein by reference.

BACKGROUND OF THE INVENTION

Providing at least a limited form of communication via powerlines, i.e., transmission lines and associated infrastructure deployed for the primary purpose of distributing electrical energy, has been around for approximately 40 years. For example, communication over powerlines was initially utilized by power transmission companies for monitoring and controlling power transmission infrastructure, such as to monitor power transmitted through particular nodes in the power grid and/or to control power grid switches when a fault or overload condition is detected. Additionally, power transmission companies have occasionally utilized such communications to transmit voice, such as between a field service technician and a distribution station operations center to facilitate the installation or maintenance of power transmission equipment.

Accordingly, those providing such communications were primarily interested in the long distance transmission lines, e.g., in the range of 50 kilometers, such as might be associated with the high voltage transmission lines connecting a power distribution station to a power generation plant or power distribution sub-stations. Typically, in providing communications via powerlines over the above described distances, power transmission companies utilized very low frequencies, such as on the order of a few kilohertz, in order to minimize attenuation of the communication signal. Accordingly, only a very small bandwidth was available for communications, although such a small bandwidth was sufficient for the relatively limited amount of communication required for monitoring, control, and voice signaling implemented in the past.

The use of such powerlines for transmission of communication signals was, and is, impeded by characteristics of the power line environment in addition to the aforementioned signal attenuation limiting bandwidth. For example, power transmission systems are typically replete with transformers disposed in the power line transmission path to provide voltage conversion. Specifically, transmission of a high current through a transmission line results in resistive losses greater than transmission of a high voltage through the same transmission line. Accordingly, transmission of a desired amount of power may be accomplished more efficiently by transmitting a relatively high voltage with a correspondingly relatively low current. However, to provide the desired power at the loads the voltage generally needs to be relatively low and/or the current relatively high and, therefore, power transmission systems include a number of transformers disposed throughout, such as transformers at power distribution sub-stations to transform high voltage (e.g., 350 kilovolts) transmitted from a power distribution station to a medium voltage (e.g., 30 kilovolts) and transformers at subscriber distribution nodes to transform medium voltage transmitted from a power distribution sub-station to a low voltage (e.g., 110 volts) for subscriber use. Each such transformer presents a potential choke or block to communication signal transmission, even the relatively low frequency communication signals described above. Specifically, these transformers are designed to very efficiently pass energy at the native frequency of the transmitted power, e.g., 60 Hz in the United States or 50 Hz in Europe, but effectively provides a filter with respect to signals substantially outside of this native band.

Although early communication via powerlines was primarily utilized in situations in which the presence of such transformers did not significantly impede the communications, e.g., long distance communications between a power distribution station and a power distribution sub-station utilizing only the high voltage transmission lines therebetween, further penetration of transmission of communication signals required a solution to the blocking of communication signals by the transformers. Accordingly, power transmission line couplers were later developed to provide a communication signal by-pass path around such transformers.

It should be appreciated that providing a power transmission line coupler to establish an effective transformer by-pass path is typically very complicated and expensive. Specifically, the potential (voltage) difference between the two power transmission lines being coupled is generally very great, e.g., on the order of 300 kilovolts in some situations where high voltage is transformed to medium voltage and on the order of 30 kilovolts in some situations where medium voltage is transformed to low voltage. Accordingly, a coupler for use in such a communication system is required to provide communication signal transmission while providing protection or isolation of the greatly different voltages. The solutions developed to meet such criteria have generally been unable to accommodate a high frequency communication signal transmission and, therefore, have continued to limit power line communication signals to low frequencies and low bandwidths. Moreover, due at least in part to the expense, complexity, and reliability of such transmission line couplers, these couplers have not been utilized to provide communications via powerlines down to the power subscriber level.

In an alternative solution to the blocking of communication signals by the transformers, later implementations have utilized wireless communication links. For example, a power transmission company may utilize the aforementioned high voltage transmission lines to carry communication signals relatively long distances and, before encountering a transformer in the communication path, deploy a wireless transmitter to complete the last portion of the communication path, e.g. that associated with medium voltage transmission lines. Generally, the communication path associated with the medium voltage transmission lines is shorter than that of the high voltage transmission lines. For example, it may be desired to control a switch, control a capacitor bank for power factor control, or monitor power transmission associated with a medium voltage portion of the power grid. Medium voltage portions of the power grid are typically associated with a relatively small area corresponding to an area served by a power transmission sub-station. Accordingly, a wireless transmitter may be coupled to a high voltage transmission line at a power transmission sub-station and utilized for providing communication links throughout much of the area served by that sub-station.

Additionally, wireless solutions have been implemented in order to provide communication at the subscriber level of the power transmission system. For example, power meters having a wireless transmitter have been deployed at subscriber sites to provide communication of meter readings. According to one embodiment, wireless receivers are deployed upon service vehicles, such as garbage trucks, which regularly canvas subscriber areas. As such vehicles pass within range of power meters having such wireless transmitters, the receivers may receive and record information, such as the current meter reading. The wireless receivers may then be linked to a power transmission company system, such as via a dial-up or wide area network connection, at a service vehicle depot, e.g., the city garage. Although providing communication of information from a subscriber site to the power transmission company, this solution suffers from several disadvantages. The system requires relatively expensive wireless communication systems to be disposed at every subscriber location to which communications are to be established as well as upon a typically large number of corresponding service vehicles. This system does not leverage any of the existing power transmission system infrastructure. Moreover, the communication of data from the subscriber site to the power transmission company is substantially delayed and, therefore, real-time monitoring of conditions, such as power outages, is not possible.

Another solution for providing penetration of communications to the subscriber level has been to implement a very low speed communication system. Specifically, power meters have been deployed which communicate their reading information via powerlines using a very low frequency transmission. Accordingly, such communication signals can traverse transformers optimized for very low frequency power transmission and, therefore, the use of the aforementioned transmission line couplers at subscriber distribution points may be foregone. However, such systems provide a very low bandwidth, such as communicating 48 bytes of data in a 24 hour period. This very low bandwidth may be acceptable for use in limited situations, such as transmitting the power meter reading once a month, but is not acceptable for providing a wide variety of communications.

It can be seen from the foregoing that power line communication systems have traditionally not been effective at penetrating the subscriber level. However, there are a number of advantages in providing such communication to the subscriber sites. In addition to the aforementioned ability to read the power meters at subscriber sites, such as for monthly billing purposes, it may also be advantageous to provide communication at the subscriber level in order to control power consumption peaks and/or to monitor operation of the power grid. For example, a power transmission company may wish to provide energy savings and/or avoid the need to obtain new sources of electric power by controlling subscriber loads. Specifically, as periods of peak energy consumption are detected, a power transmission company may wish to reduce non-essential use of electricity, such as by turning off a hot water tank, an air conditioning compressor, a swimming pool pump, or the like at a subscriber home or office. Likewise, a power transmission company may wish to control the subscriber load, such as through adjusting capacitors, to increase efficiency of the consumption of power by the subscriber.

Additionally or alternatively, a power transmission company may wish to monitor operation of the power grid as seen by the subscriber in real-time. Currently, a power transmission company is made aware of a power grid fault or other interruption in service through subscriber complaint. However, through the use of real-time communications at the subscriber level, the power transmission company may monitor interruptions in service and even the quality of service as experienced by the subscribers without subscriber interaction.

BRIEF SUMMARY OF THE INVENTION

The present invention is directed to systems and methods which provide communications to a subscriber level of a network using a hybrid communication network. Preferred embodiments of a hybrid communication network of the present invention provide communications using both fiber media and electrically conductive media. Accordingly, existing network infrastructure, such as power line rights of way, support poles, conduits, transmission lines, and the like, may utilized in economically providing a communication link between a central location and any number of subscriber sites.

Today many high voltage power transmission lines are being deployed having fiber optic cables associated therewith. For example, fiber optic cables may be laid along the high voltage powerlines and/or included as a component of the high voltage powerlines, such as a strand included within a bundle of electrically conductive strands. Such fiber may be deployed to provide control of aspects of the power grid. Specifically, when a fault is detected in a high voltage transmission line it may be necessary to switch that transmission line out of a power transmission path. However, power grids are typically designed in loops to allow current to flow in either direction and, therefore, provide fault tolerance. If a transmission line having a fault to ground, for example, were to be switched out of the transmission path only at a power distribution station, current would typically then flow from the other end of the transmission line, e.g., a power distribution sub-station, resulting in an unbalanced network condition. Such an unbalanced condition can result in a cascade failure and/or equipment damage.

Accordingly, fiber optic cables may be utilized to communicate control signals for switching transmission lines out of the power transmission path. Specifically, a fiber optic cable may be utilized to coordinate operation of a circuit breaker at a power distribution station and a corresponding circuit breaker at a power distribution sub-station to simultaneously disconnect both ends of a high voltage transmission line out of the power grid and, thereby, avoid an unbalanced condition.

The aforementioned fiber optic cable laid with the power transmission lines typically stops at the power distribution sub-stations. However, the power transmission companies generally have rights to lay cables in rights of way, from support poles, etcetera. Accordingly, it may be relatively easy and economical to similarly deploy fiber optic cable corresponding to various medium voltage power transmission lines, e.g., from power distribution sub-stations to subscriber distribution points associated with low voltage transformers.

Rather than utilizing power transmission line couplers of the prior art to provide a bypass signal path around transformers, preferred embodiments of the present invention bring fiber optic cables to a point just beyond the last transformer before a subscriber in the power grid. At a point on the subscriber side of the last transformer, e.g., a low voltage subscriber distribution point transformer, the communication signal is preferably coupled from the fiber optic cable of the preferred embodiment to the power transmission line.

It should be appreciated that the distance from a low voltage transformer to a subscriber site in a power transmission system is typically less than 400 meters. Accordingly, the preferred embodiment of the present invention provides communication signal penetration to a subscriber level of the network with a hybrid communication network in which relatively long distances are bridged by fiber optic cables and relatively short distances are bridged by existing conductive media.

Providing communication infrastructure to the last 1500 feet of a subscriber link is generally considered to be the most expensive portion of providing a communication link. However, the preferred embodiment utilizes existing infrastructure for this last portion of the communication link and, therefore, presents an economic solution. Moreover, the subscriber links of the preferred embodiment are point-to-multipoint, further enhancing the economics of deploying the present invention.

The preferred embodiment hybrid communication network, providing a power transmission line communication link only on the subscriber side of the last transformer, avoids bandwidth limitations of the prior art power transmission line couplers. Moreover, as the power transmission lines utilized for such communications are relatively short, e.g., on the order of 400 meters or less, relatively broad signal bandwidth is available for communicating signals over the power transmission lines. This, combined with the broad bandwidth available through fiber optic transmission media, provides a broadband hybrid communication network according to a preferred embodiment of the present invention. Accordingly, high speed communications may be reliably implemented according to preferred embodiments of the present invention. Additionally or alternatively, communication bandwidth may be available for uses other than and/or in addition to utilization by a power transmission company for management, monitoring, and control functions. For example, broadband communication access may be sold to subscribers, thereby providing additional revenue to power transmission companies.

The availability of broadband communications via a subscriber power transmission line connection is advantageous for a number of reasons. In addition to utility companies generally welcoming new sources of revenue, it should be appreciated that there are typically only three types of lines which can penetrate into a subscriber site, those being cable television, telephone, and electricity. Accordingly, there is typically a very limited universe of sources for providing subscribers with a broadband communication link.

Moreover, each of these types of lines has its own limitations with respect to availability of broadband into subscriber sites. For example, telephone companies are having great difficulty in providing broadband connections due to such issues as subscriber proximity to a central office, and the number of pairs in a trunk line which can carry broadband communications without causing unacceptable interference in communications of other pairs in the trunk line. Likewise, cable television companies experience problems in providing broadband communications as broadcasting of hundreds of television channels leaves only a limited amount of bandwidth available for broadband communications. However, as cable distribution nodes often serve up to 300 subscribers, the bandwidth available in the transmission media for broadband communications is often insufficient to provide the quality of service such a number of subscribers require. Although additional broadband channels might be added, each portion of spectrum allocated to broadband communications reduces the amount of spectrum available for the core business of television signal broadcasting.

Accordingly, there is a great opportunity for the use of power transmission lines in providing broadband communications to subscribers. This particular media has not been successfully exploited due to the disadvantages in prior art attempts discussed above and, therefore, presents a need in the art for the hybrid communication networks of the present invention. Moreover, it should be appreciated that there are more subscriber sites (e.g., households and businesses) in the world having power transmission lines coupled thereto than telephone lines and cable television lines, thereby creating a unique opportunity for very large scale penetration at the subscriber level.

In implementing preferred embodiments of the present invention various node devices are utilized throughout a hybrid communication network to provide an integrated communication system in which the node devices cooperate to provide a transparent hybrid communication network presenting desired interfaces to subscribers and service providers. Particular protocols may be implemented within the hybrid communication network of the present invention in order to provide multiplexing/demultiplexing of subscribers' signals and/or to accommodate various transmission media. However, preferred embodiments provide standardized protocols at interfaces to facilitate network deployment and implementation. For example, subscriber and service provider equipment may couple to the network using a standard interface without requiring special configuration for communication via the hybrid communication network of a preferred embodiment.

One node device according to the preferred embodiment is a network gateway, referred to herein as an optical hub, preferably providing an interface between the hybrid communication network and systems external thereto, such as a service provider point of presence (POP), a network operations center (NOC), an energy management system, a network (such as a local area network (LAN), a metropolitan area network (MAN), a wide area network (WAN), the Internet, etcetera), and/or the like. For example, an optical hub of the present invention may be deployed at a power distribution station or substation to provide a gateway interface between a fiber optic cable of the hybrid communication network and an external network. Preferred embodiments of the optical hub provide an external interface to the hybrid communication network which communicates according to standardized protocols, such as Ethernet (preferably Gigabit or Multi-Gigabit Ethernet), TCP/IP, SONET, ATM, and/or the like, in order to readily interface with external systems.

Another node device according to the preferred embodiment is a fiber optic media to electrically conductive media coupler, referred to herein as a hybrid fiber/powerline (HFP) hub, preferably providing an interface between different transmission media of the hybrid communication network. Preferred embodiments of the HFP hub are adapted to provide highly reliable operation and are relatively inexpensive to manufacture and deploy. Accordingly, preferred embodiments of the HFP hub provide conversion of a communication signal between different media with a minimum amount of signal processing.

Although a most desired solution might be one in which a completely passive network is deployed between a service provider point-of-presence and the subscribers, such as in the case of a passive optical network (PON), real world economics, logistics, and infrastructure often prohibit deployment of such an ideal solution. However, the HFP hub of the preferred embodiment, preferably the only active component disposed in the hybrid communications network between a service provider and the subscribers, is a very simple device providing substantially only transformation of communication signals between two transmission mediums and, perhaps, providing simple data packet selection. Such an embodiment provides not only a relatively inexpensive device which may be deployed economically throughout a power transmission system, but also provides a device which may be easily installed by field service personnel of the skill level generally available with respect to power transmission company linesmen. Moreover, the HFP hub of the preferred embodiment is very economical because it is serving multiple subscribers according to a preferred embodiment.

Still another node device according to the preferred embodiment is a subscriber interface, referred to herein as a HFP portal, preferably providing an interface between the hybrid communication network and subscriber site equipment, such as power transmission infrastructure (e.g., power meters, load balancing capacitors, etcetera), powered devices (e.g., air conditioners, hot water heaters, etcetera), subscriber termination equipment (e.g., computer systems, telephony systems, etcetera), and/or the like. For example, a HFP portal of the present invention may be deployed at a power meter or a load center at a subscriber site to provide an interface between a power transmission line of the hybrid communication network and equipment at the subscriber site. Preferred embodiments of the HFP portal provide an interface to the hybrid communication network which communicates according to standardized protocols, such as Ethernet (preferably 10 or 100 Megabit Ethernet), TCP/IP, RS 422, iLon, and/or the like, in order to readily interface with subscriber systems.

It should be appreciated from the above that a technical advantage of the present invention is that high speed communications are provided using power transmission lines in a hybrid communication network of the present invention.

A further technical advantage of the present invention is that the preferred embodiment network node devices cooperate to provide an integrated network solution in which a transparent hybrid communication network provides desired interfaces to subscribers and service providers.

A still further technical advantage of the present invention is provided in that the preferred embodiment hybrid communication network is very economical because it is serving multiple subscribers and/or multiple applications, such as communication, power controls, energy savings.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 2 shows broadcasting of packets in a downstream path according to an embodiment of the present invention;

FIG. 3A shows use of an internal address to encapsulate a datagram according to a preferred embodiment of the present invention;

FIG. 3B shows broadcasting of an encapsulated datagram in a downstream path according to a preferred embodiment of the present invention;

DETAILED DESCRIPTION OF THE INVENTION

Preferred embodiments of the present invention provide a point-to-multipoint data communication network. A most preferred embodiment of the present invention comprises a hybrid fiber/powerline (HFP) broadband communication network providing point-to-multipoint communications. For example, embodiments of the present invention may provide network systems to allow a power transmission company to monitor and/or control service to subscribers and subscriber premise equipment and, therefore, a power transmission company network operations center may be placed in communication with a number of subscriber sites. Additionally or alternatively, embodiments of the present invention may provide data communication between a centralized system or systems and various subscriber premise equipment and, therefore, a network server or other service provider point-of-presence (POP) may be placed in communication with a number of subscriber sites.

It should be appreciated that a point-to-multipoint data communication system may be implemented in a number of ways. For example, a star topology may be utilized in which a separate communication path or link is provided between each subscriber site and a central node. Another configuration for providing point-to-multipoint data communication is a tree topology in which communications are trunked (communication paths shared) for portions of the network common to multiple subscribers and branches provided for links to subscriber sites as their disposition requires. A tree topology is typically considered to be a more economical approach as trunked resources are shared among subscribers. However, implementing a tree topology is not without problems, including allocating and controlling use of the shared resources.

Figure 12:
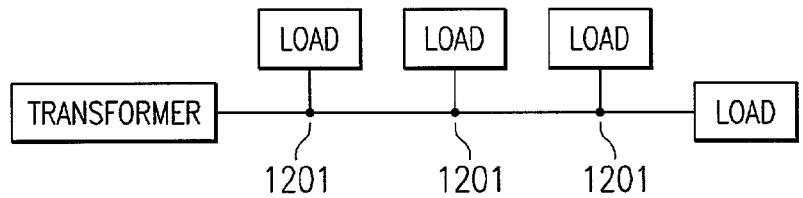
FIG. 12 shows a single feed configuration of a portion of a powerline network.
Figure 13:
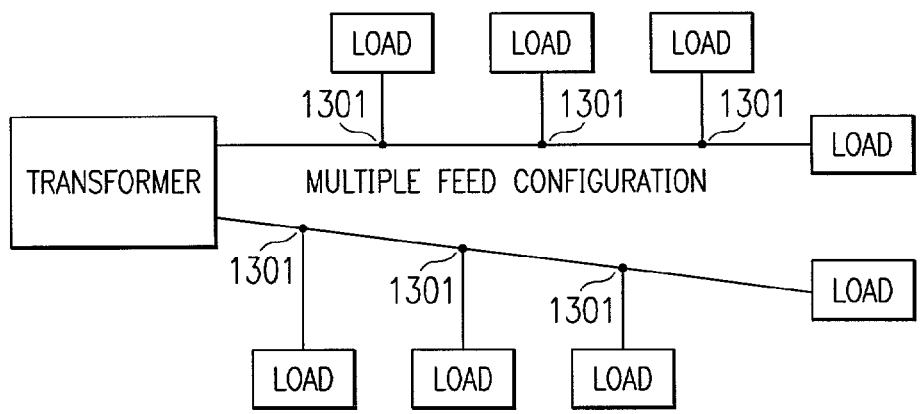
FIG. 13 shows a multiple feed configuration of a portion of a powerline network.

A typical power distribution grid provides somewhat of a tree topology in its native configuration (see FIGS. 12 and 13, for example). Accordingly, preferred embodiments of the present invention utilize a tree topology substantially corresponding to links of a power distribution grid (or portions thereof) to provide an economic network infrastructure. Such an embodiment optimizes the use of network resources, such as relatively long cable runs from a power distribution station and/or power distribution substation, while providing individual links for subscriber site penetration.

Preferred embodiments of HFP broadband communication networks of the present invention bypass transformers in a power distribution system with broadband communications because of the difficulties associated therewith. For example, voltage transformers as are typically found in a power distribution system often do not pass modulated broadband signals imposed on the powerlines. Moreover, jumper connections to allow a broadband signal to bypass a voltage transformer, such as converting powerline transmission voltage from high voltage to medium voltage, are typically plagued with problems due to the relatively high potential difference between the powerlines bridged.

Accordingly, preferred embodiments of the present invention provide a hybrid fiber/powerline communication system in which fiber is used in communication between a point of presence, such as at a transmission station or substation, and a point on the subscriber side of the last power transmission system transformer, e.g. a medium voltage to low voltage power system transformer. In such an embodiment power system rights of way, transmission line poles, fiber within power transmission lines, etc. may be utilized to cost effectively provide fiber infrastructure for broadband communications. Moreover, existing powerline connections, such as typically serve from 4-12 subscribers in the United States and in the hundreds of subscribers in foreign countries, may be economically utilized to provide the "last mile" or "last quarter mile" of communication links often the most cost prohibitive to deploy.

It should be appreciated that infrastructure for the so called last mile is typically cost sensitive, due in part to alternative solutions such as cable modem and DSL as well as competition due to the mass-market size. However, preferred embodiments of the present invention provide a cost effective solution for addressing "last mile" issues.

Preferred embodiments of the invention are adapted for acceptance by power transmission system operators, in a number of ways. For example, hybrid fiber/powerline hubs, such as are preferably deployed to couple fiber transmission media to powerline transmission media, are configured to be substantially passive devices to both reduce cost and to increase reliability.

Additionally, embodiments of such hubs, as well as other equipment utilized according to the present invention, are preferably adapted to allow deployment with the skill level typically available from power transmission system linesman or similar field personnel. Preferably, the number of units deployed is not limited by installation and commissioning capacity, different environmental conditions etc. and, therefore, are adapted for simplified installation and configuration, such as through the use of "plug and play" environment awareness and self configuration and provisioning. As an example, outside equipment may be installed by existing power laborers, and in-building equipment may be installed by the end-user, making plug and play component initialization highly desirable. HFP hubs of the present invention may autonomously communicate their presence and/or accept operation/configuration information, such as an equipment number or other information utilized in a private addressing scheme of a preferred embodiment, when properly deployed in a network. Similarly, HFP portals of the present invention may operate to autonomously recognize and/or configure network operation.

Further enhancing the power transmission system operators' acceptance of the present invention, preferred embodiments provide load management services, allowing a power transmission system operator to balance subscriber loads for more efficient power usage, operation services, allowing a power transmission system operator to monitor power conditions at subscriber premises to detect faults, interruptions, and other conditions, value added energy management services, allowing a power transmission system operator to control peak energy usage, and/or like enhanced services. For example, data communication provided according to the present invention may be utilized for remote monitoring capability to prevent and reduce power blackout intervals and equipment damage by fast fault isolation and load management. Such capabilities serve to increase subscriber satisfaction with power transmission services as well as to benefit the subscriber's internal operation. Likewise, data communication provided according to the present invention may be utilized for automatic value-added energy services, such as to reduce peak power load from the network. Reducing the peak load can benefit the power utility companies by delaying the requirement of new power generation stations, delaying the requirement of new transmission systems, avoiding equipment damage, as well as providing operational savings by reducing high cost peak power.

In addition to or in the alternative to the above, preferred embodiments of the invention allow power transmission system operators to obtain additional revenue through providing media through which subscriber data may be carried. With a preferred embodiment HFP broadband communication system installed, a power transmission company is ready to be a broadband Internet access wholesale company, giving unbundled Internet service providers (ISPs), such as AOL, Earthlink etc., the ability to compete with bundled ISPs, such as Bellsouth, ATT, Time Warner etc. For example, a power transmission system operator may sell bandwidth not utilized in providing the above described enhanced services to an unbundled Internet service provider to allow that Internet service provider to offer a bundled broadband service.

Accordingly, a preferred embodiment of the invention provides a HFP network system using fiber to by-pass power transformers and powerline connections to access buildings of the subscriber sites. It should be appreciated that the combination of fiber and short powerline distances provides a broadband transmission media with large area coverage. Additionally, the preferred embodiment combination of passive optical network (PON) and powerline distribution network utilizes similarities in the configurations to share many circuitries within the system for added economy.

Figure 1:
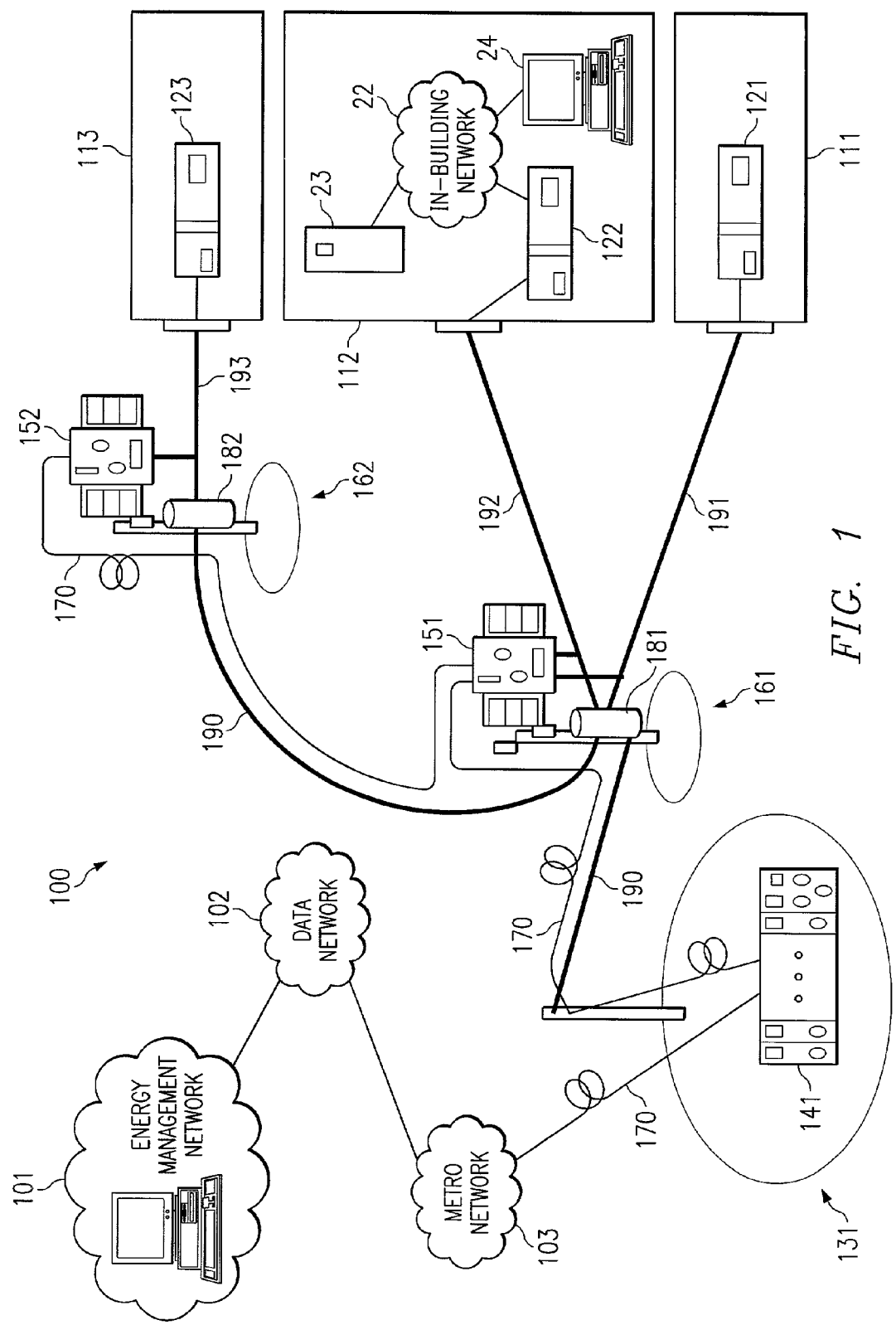
FIG. 1 shows a preferred embodiment hybrid fiber/powerline broadband communication network of the present invention.

Directing attention to FIG. 1, a preferred embodiment HFP broadband communication system is shown as network system 100. It should be appreciated that network system 100 utilizes a tree topology substantially corresponding to links of a power distribution grid (or portions thereof) to provide an economic network infrastructure. Specifically, the illustrated portion of a power distribution grid includes power distribution substation 131 coupled to subscriber distribution points 161 and 162 by medium voltage links 190. Low voltage transformers 181 and 182, disposed at subscriber distribution points 161 and 162 respectively, reduce the voltage of the transmitted power for delivery of electricity to subscriber sites 111-113 through corresponding ones of low voltage links 191-193.

Fiber optic links 170 of the preferred embodiment HFP broadband communication system are disposed to substantially correspond to medium voltage links 190 coupling low voltage subscriber distribution points 161 and 162 to power transmission substation 131. Low voltage links 191-193, corresponding to subscriber sites 111-113 respectively, are coupled to fiber optic links 170, preferably using HFP hubs 151 and 152, to provide a communication link between subscriber sites 111-113, preferably employing HFP portals such as HFP portals 121-123, and power transmission substation 131, preferably employing an optical hub such as optical hub 141. Such an embodiment leverages power system rights of way, transmission line poles, and/or fiber within power transmission lines as well as preexisting links into individual subscriber sites to cost effectively provide for broadband communications. It should be appreciated that, although separate connections are shown, the HFP hubs of the present invention may utilize a single connection to provide links to a plurality of subscriber sites and/or subscribers. For example, low voltage links 191 and 192 may be electrically coupled, such as at an output of low voltage transformer 181, and therefore a single connection to HFP hub may be utilized to provide network communication to subscriber sites 111 and 112. Additionally or alternatively, multiple subscribers may be associated with a same subscriber site, such as where a subscriber site comprises an office building or multi-family dwelling, and therefore a same low voltage link may be utilized in providing network communication to multiple subscribers.

From FIG. 1 it can be seen that the HFP broadband communication system of the preferred embodiment has at least two external interface points. A first such interface is at the HFP portals and preferably provides an interface to such customer premise equipment as, local area network (LAN) 22, load 23, and/or computer 24.

A second external interface is at the optical hub or hubs and preferably provides an interface to such systems as metro network 103, data network 102, and/or management network (e.g., energy management and/or network management network) 101. For example, management network 101 may comprise a network operations center (NOC) which monitors network equipment and/or equipment consuming power, perhaps providing control thereof. Data network 102, for example, may provide edge switch nodes and dictated or switched connectivity to support many users, such as the Internet comprising switches, routers, transmission lines, network management and DNA. Metro network 103, for example, may provide a transport network to connect end users to edge nodes and/or among edge nodes, such as a network comprising SONET rings, microwave links, and/or the like.

The external interfaces provided according to the present invention are preferably adapted for communication according known protocols to therefore facilitate coupling of standardized equipment thereto. For example, the external interfaces of a preferred embodiment may be 100baseT or Gigabit Ethernet, although other Protocols may be used. Accordingly, communication may be provided according to the present invention between various centralized systems such as an ISP POP, a power transmission company energy management system, a communication network, such as the Internet or a public switched telephone network (PSTN), and the like and remotely located systems such as subscriber data processing equipment, subscriber telephony equipment, subscriber loads, service provider equipment, and the like.

It should be appreciated that any number of connections may be utilized in providing network connectivity at the optical hub of the present invention. For example, direct connectivity may be utilized by coupling network center equipment to an interface, e.g. the aforementioned Ethernet interface, of the optional hub. Additionally, various backbones, such as the PSTN, the Internet, a LAN, a WAN, a MAN, wireless links, and/or the like may be utilized to provide desired connectivity. It should be appreciated, therefore, that a point of presence for ISP connection could be at the optical hub, an Internet hotel, an Internet exchange, or other locations. Moreover, it should be appreciated that multiple external interfaces may be provided by the optical hub, or the HFP portal, according to embodiments of the present invention.

Having defined various interface points in the network system of the preferred embodiment, a simplest network architecture may be to provide connectivity between these points. However, in the network system of FIG. 1, architectural requirement presents well known problems associated with "point to multi-point" and "multi-point to point" networking. It should be appreciated that the preferred embodiment tree topology presents various challenges in implementing broadband communication. For example, techniques for the sharing of trunked resources should be adopted. Specifically, as communications associated with multiple subscribers are to share particular network resources, preferred embodiment implementations are adapted to allow the use of such shared resources while providing a desired communication bandwidth and/or quality of service to the subscribers.

Because downstream information (information from a central access point to the multiple subscriber sites) is introduced into a network system of the present invention at a particular point, downstream communication may be relatively easily managed. For example, as a single (or relatively few) number of central points introduce downstream data into the network system, a broadcast method of data transmission may be implemented which efficiently and reliably shares trunked resources. Accordingly, transmission from the optical hub to the HFP portals of the present invention may use Ethernet packets or other packet addressable protocol (e.g., IP address based routing protocol).

Using such a packet addressable protocol, a packet that comes into optical hub 141, such as from metro network 103, data network 102, and/or management network 101, may be delivered to the appropriate HFP portal, e.g., HFP portals 121-123, as a packet by the various network devices referencing packet address information. For example, all packets associated with network system 100 may be broadcast by optical hub 141 into fiber optic link 107. The HFP hubs, here HFP hubs 151 and 152, may detect relevant packets (e.g., packets having an address associated with a HFP portal coupled to the particular HFP hub) and ignore all the irrelevant packets (e.g., packets having an address associated with a HFP portal coupled to a different HFP hub). The relevant packets at each HFP hub may be broadcast by that HFP hub into low voltage links coupled thereto, e.g., low voltage link 191 and/or 192 for HFP hub 151 and low voltage link 193 for HFP hub 152, to corresponding HFP portals, e.g., HFP portals 121 and 122 coupled to HFP hub 151 or HFP portal 123 coupled to HFP hub 152. The HFP portals may detect relevant packets (e.g., packets having an address associated therewith) and ignore all the irrelevant packets (e.g., packets having an address not associated therewith).

The above described broadcasting of packets may be provided without any non-value added protocol between the external interfaces. For example, addressing schemes utilized in external networks, such as Ethernet networks implementing IP routing as is well known, coupled to HFP broadband communication systems of the present invention may be utilized for directing packets within the HFP broadband communication system. However, preferred embodiments use an intra-system addressing scheme, such as a header encapsulation scheme, in the system architecture to simplify the HFP hub functionality. The preferred embodiment intra-system addressing scheme preferably provides a "private" address for nodes within the HFP broadband communication network. Benefits associated with the use of a preferred embodiment intra-system addressing scheme include cost reductions and system reliability approaching an all-passive network as HFP hub configurations may be simplified for use with such an addressing scheme.

Directing attention to FIG. 2, broadcasting of packets in the downstream path is shown. In operation as described above and as illustrated in FIG. 2, the downstream path signal will preferably be broadcasting all packets from the optical HUB to all HFP hubs. For example, incoming packets 210, shown here being provided from wide area network 201 (such as may correspond to any of metro network 103, data network 102, and/or management network 101 of FIG. 1) include public address information, such as Ethernet IP addresses associated with particular subscriber systems. Optical hub 141 preferably translates the public addressed packets to include a private address and, therefore, sends private addressed packets 220 to HFP hubs 151 and 152.

The HFP hubs preferably receive the same signal and select the relevant packets based on the private address and send the selected packets to the HFP portals coupled thereto. It should be appreciated that particular packets correspond to particular HFP portals and/or subscriber systems. For example, packets 221 and 223 may correspond to HFP portal 121 and/or subscriber systems coupled thereto. Similarly, packet 222 may correspond to HFP portal 122 and/or subscriber systems coupled thereto. Accordingly, each HFP hub may select the packets with appropriate private IP addresses for broadcast by the HFP hub to HFP portals coupled thereto. For example, HFP hub 151 may select only packets 221-223 of private addressed packets 220 for rebroadcast to HFP portals. The HFP portals may extract the messages with a private IP address intended for that HFP portal and/or subscriber systems coupled thereto. For example, HFP portal 121 may select packets 221 and 223 from those broadcast by HFP hub 151. Similarly, HFP portal 122 may select packet 222 from those broadcast by HFP hub 151.

According to a preferred embodiment, a HFP broadband communication network may have a pool of public addresses to be shared among and assigned to the subscriber equipment coupled to the HFP network. When a subscriber powers up, or otherwise activates for communication, a HFP portal, the HFP portal will preferably obtain an IP address through a dynamic hosting configuration protocol (DHCP) or similar protocol. When the HFP portal receives the assigned IP address, the subscriber equipment coupled to the HFP portal can preferably transmit and receive messages to and from other equipment coupled to the HFP network, such as an Internet service provider. When the subscriber equipment is inactive over a period of time, the assigned IP address will preferably be removed by the DHCP. However, when the subscriber equipment again becomes active, the HFP portal will preferably repeat the IP address obtaining process via the DHCP.

Each HFP hub and HFP portal preferably has a unique internal or private address (discussed in further detail below) with respect to the preferred embodiment HFP broadband communication network. Such internal addresses of the preferred embodiment are assigned automatically during an initialization process and the internal address design preferably includes addresses for packets that are designated for HFP hubs and HFP portals. The internal addresses may be used to encapsulate a datagram, e.g., a packet in an external network native format, as shown as datagram 302 in FIG. 3A. The encapsulation header, header 301 of FIG. 3A, preferably consists of HFP hub and/or HFP portal addresses with FEC and ideal bytes. The purpose of the preferred embodiment ideal bytes is to allow hardware to determine the datagram without buffering the datagram, thereby facilitating the use of simplified HFP hubs.

It should be appreciated that the optical hub of the preferred embodiment is shared among many subscribers and, therefore, presents less cost sensitivity than some other network devices. Moreover, it should be appreciated that the HFP hubs of the preferred embodiment are deployed in relatively large numbers leading to greater cost sensitivity. Additionally, the HFP hubs are expected to be deployed in relatively harsh environments militating against complex and/or expensive electronic circuitry. Accordingly, the preferred embodiment of the present invention utilizes the aforementioned private addressing scheme to allow simplification of such HFP hubs. Specifically, using private addresses which are substantially permanently assigned to various network devices, preferred embodiment HFP hubs may be deployed which provide the requisite level of packet routing/switching in a hardware implementation. Such an implementation presents a relatively simple and highly reliable configuration, in addition to reducing the latencies associated with transmission of a datapacket as compared to the use of typical software routing/switching techniques. Accordingly, the preferred embodiment configuration using private addressing as described above allows for the more complex operations, and therefore modules, to be disposed in the optical hub and/or HFP portals, while allowing a relatively simple HFP hub configuration to be used. This preferred embodiment provides a network link between such optical hubs and HFP portals which is substantially passive, approaching that of a PON.

The destination routing header architecture of the preferred embodiment is similar to the Ethernet or IP packet based architecture discussed above, except that the HFP optical hub of this embodiment preferably encapsulates the packet with an equipment identification number or other unique header in front of each packet, as shown in FIG. 3A. Accordingly, the HFP hubs and HFP portals can preferably select the right packet based on the user destination routing header in real time, as illustrated in FIG. 3B. In other words, there is no long buffer involved as is typically the case with IP switching. An advantage of this embodiment is to shift the cost and complexity to the optical hubs and make the HFP hubs and/or HFP portals more economical and simplified with less latency and higher reliability.

The internal address information is preferably stripped from the packets by the HFP portals to thereby provide a packet in its native form at the HFP portal external interface.

Accordingly, the preferred embodiment of the invention presents a communication network which is transparent to external systems coupled thereto. By providing a standardized interface protocol at the optical hub and HFP portals, systems coupled thereto may utilize commonly available data communication interfaces without requiring special adaptation for communication via the preferred embodiment HFP broadband network system. Of course, it should be appreciated that the present invention is not restricted to use of a same interface protocol at all external interfaces thereof. For example, the optical hubs and/or HFP portals may provide arbitration between various interfaces, such as Gbit Ethernet, 100 Mbit Ethernet, 10 Mbit Ethernet, SONET, ATM, and the like, to thereby facilitate bridging of communications between systems using different communication protocols.

In terms of the preferred embodiment data rate requirements, the down stream signal may use packet division multiplex as shown in FIG. 3B with a data rate approximately equal to powerline data rate times number of HFP HUBs. According to a preferred embodiment, the data rate is 8×20 Mb/s=180 Mb/s, or equivalent to OC-3 optical technology.

Figure 4:
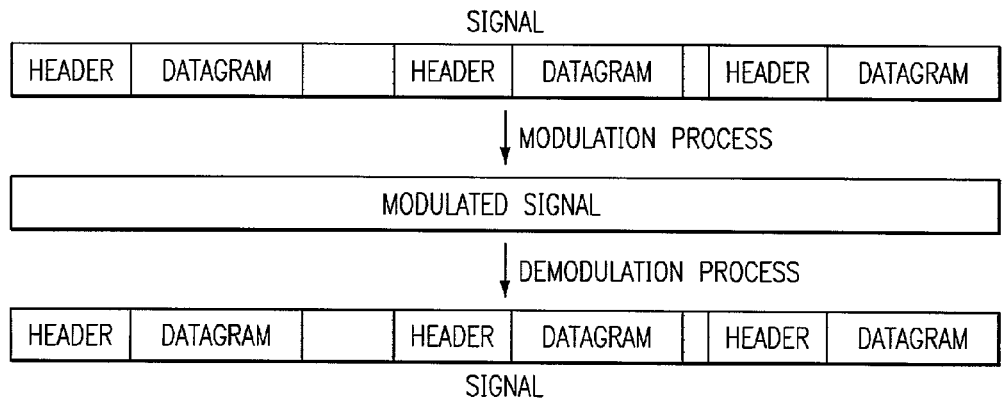
FIG. 4 shows modulation to change a signal format for transmission in a particular medium.
Figure 5:
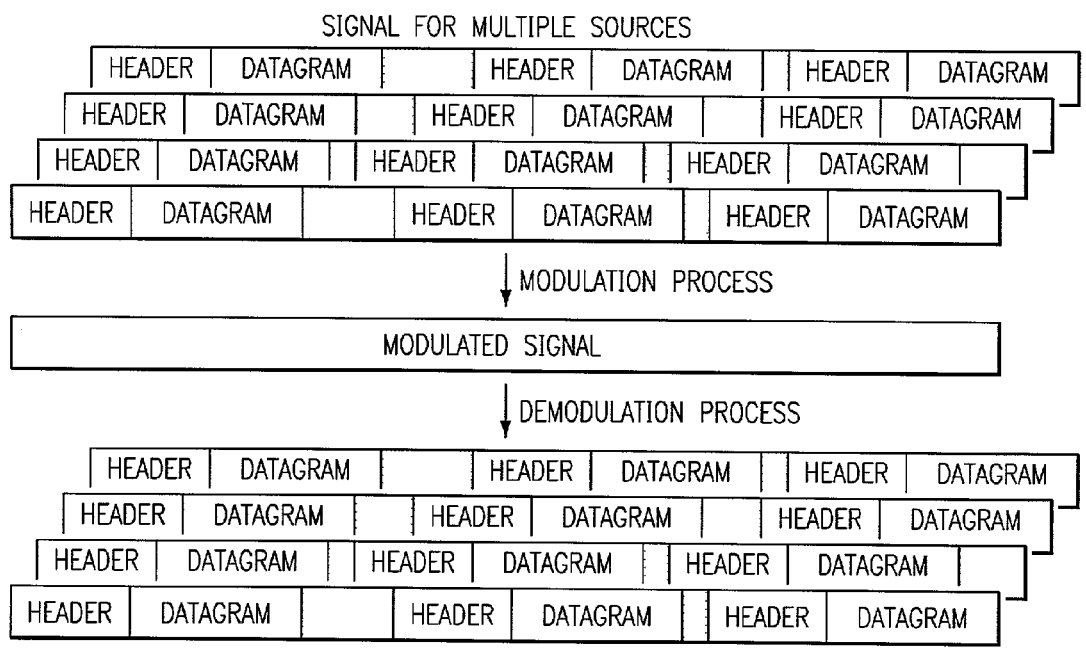
FIG. 5 shows multi-location source transmission through a common medium.
Figure 6:
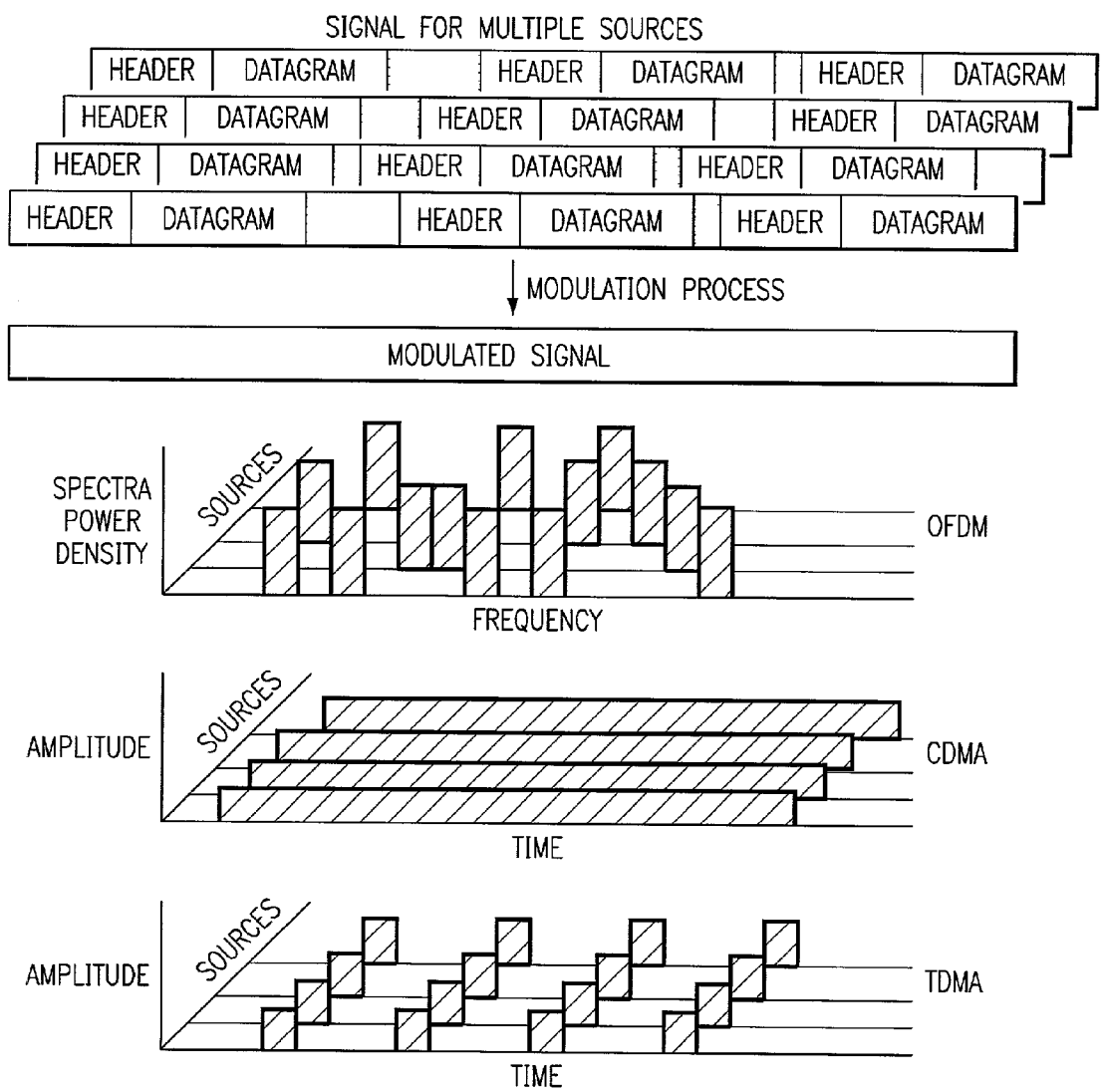
FIG. 6 shows three techniques for multiplexing multiple source signals.

In the downstream path discussion above, the downstream signal was described as the intended signal, but according to the preferred embodiment the actual signal is not transmitted in the medium. Preferably modulation, a process that changes the signal format for more suitable and efficient transmission in the particular medium, such as shown in FIG. 4, is used. Signal modulation typically involves balanced coding and scrambling. For example, the down stream signal in fiber may utilize a no DC off set optical signal. In the powerline medium, the modulation is typically more complex because of the high noise environment, bridge tap environment (echo environment) and emission regulatory requirements. It is possible to simply reverse the above described broadcast techniques to provide for upstream communications (communication from multiple subscriber sites to a central access point). However, this reverse path introduces problems associated with the multipoint-to-point nature of the upstream path, e.g., multi-location sources to one common medium as shown in FIG. 5. A challenge presented in this situation is that the combined modulated signals from each source must be recoverable individually at a receiver. Accordingly, various synchronized or asynchronized transmission schemes may be utilized to allow for multiple subscriber site upstream transmissions to share network trunks without resulting in interference and while providing some availability to all such transmission sites. Three techniques for multiple sources' signals being multiplexed are shown in FIG. 6.

For example, a time division multiple access (TDMA) approach may be taken with respect to transmission of upstream packets from multiple subscriber sites. According to such an approach, each transmission site (e.g., each HFP portal and/or each HFP hub) may be synchronized in time to allow multiple ones thereof to transmit packets on the same carrier, but each at a unique time slice (burst period) to thereby provide a portion of communication bandwidth to all transmission sites requiring bandwidth.

Additionally or alternatively, a frequency division multiple access (FDMA), e.g., orthogonal frequency division multiplexing (OFDM), approach may be taken with respect to transmission of upstream packets from multiple subscriber sites. According to such an approach, each transmission site (e.g., each HFP portal and/or each HFP hub) may be assigned a particular orthogonal carrier frequency or frequencies to thereby provide a portion of communication bandwidth to all transmission sites requiring bandwidth.

Likewise, a code division multiple access (CDMA) approach may be taken with respect to transmission of upstream packets from multiple subscriber sites, in addition to or in the alternative to the above described approaches. According to such an approach, each transmission site (e.g., each HFP portal and/or each HFP hub) may be assigned a particular orthogonal spreading code (chip code) to thereby provide a portion of communication bandwidth to all transmission sites requiring bandwidth.

It should be appreciated that the above multiplexing techniques may be applied to transmissions through conductive media, e.g., the aforementioned low voltage links, as well as through optical media, e.g., the aforementioned fiber optic links. However, it is expected that optical media will provide communications at a higher speed using a higher carrier frequency. Accordingly, it may be desired to use different ones of the above multiplexing techniques in various media of a HFP broadband communication network of the present invention. However, the preferred embodiment HFP broadband communication network implements the same multiplexing technique across the various media in order to obtain economies associated with utilization of common chip sets, allow simplification of intermediary devices such as the HFP hubs, and the like. Similarly, the preferred embodiment HFP broadband communication network implements the same multiplexing technique with respect to both the downstream and upstream transmissions.

It should be appreciated that in implementing a TDMA technique it is generally necessary to establish synchronization between various system components. For example, in order to transmit packets only during a time slice assigned thereto, the transmission sites are generally provided with a common clock. However, providing for transmission of packets within assigned time slices is often not as simple as ensuring that each transmission site transmits only during an assigned time slice. There are generally propagation delays associated with the various transmission paths of the transmission sites and therefore, in order to avoid transmitted packets overlapping in time as received by a common point, techniques such as guard times and/or timing advances are implemented.

Guard times provide dead times in which no transmissions are to take place and, if established to be of a duration of a worst case propagation delay, can be used alone to avoid transmitted data packets overlapping in time at a receiving device. However, such dead times necessarily result in a significant decrease in available bandwidth.

Accordingly, more sophisticated TDMA systems will implement timing advances to allow a transmitting site to compensate for propagation delay such that transmitted packets from a plurality of transmission sites interleave as a substantially contiguous data stream at a receiving device. However, it is often a very arduous task to properly determine timing advances and for a truly contiguous data stream to be formed at a receiving device a very accurate common clock must generally be provided to each transmitting site. Moreover, the signal levels of each such time slice is often appreciably varied from the next, often requiring time for a receiving device to adjust and successfully decode the signal. Therefore, an amount of guard time is typically implemented even where timing advances are implemented, thereby resulting in an appreciable reduction in bandwidth. Additionally, training sequences may be required or may be required to be lengthened in such implementations, further resulting in reduction in available bandwidth.

Disadvantages are also encountered in implementing FDMA techniques. For example, implementation of a FDMA technique requires the division of available bandwidth into a plurality of carrier frequencies for simultaneous use by the various transmission sites. However, dividing and assigning such carrier frequencies to the various transmission sites can result in a significant portion of the bandwidth not being utilized at any particular time. For example, particular transmission sites may not require bandwidth and, therefore, the bandwidth associated with the particular carrier frequency assigned thereto may be unused for an amount of time. Moreover, division of the frequency carriers typically requires guard bands to be left unused therebetween to minimize interference between signals of the various carrier frequencies. These guard bands can result in an appreciable reduction in available bandwidth.

Dynamic allocation of the carrier frequencies may be implemented, allowing a carrier frequency or frequencies to be assigned as needed to the transmission sites then desiring bandwidth. However, such dynamic assignment of carrier frequencies requires frequency agile transmission sites, significantly complicating their implementation. Moreover, there are typically latencies associated with transmission sites dropping and picking up frequency channels as demand dictates as well as complications in coordinating the assignment of such frequency channels.

A further problem associated with the use of FDMA, particularly in the power transmission line portion of the HFP broadband communication network, is the existence of echoes causing destructive cancellation. For example, various transmission line aspects, such as a change of impedance associated with line taps and/or the connection of various nodes in the transmission line, result in reflection of transmitted signals. These reflections or echoes tend to cancel some of the transmitted signals and possibly enhance other transmitted signals, depending upon the location of the source of the echo with respect to the location of the source of the transmission. Moreover, optical devices are typically not suitable for OFDM, because of the natural of analog signal with very large peak to average ratio.

It should be appreciated that CDMA techniques are designed for use in noisy environments, such as environments in which multiple simultaneous transmissions are made and/or environments in which reflected and multipath signals are present. CDMA is a good choice according to preferred embodiments of the invention because of its suitability for high noise and bridge tap environments, its low emission (as discussed in further detail below), and its ability to be readily used in optical mediums. Moreover, although typically not able to utilize 100% of the available spectrum, CDMA techniques provide a very high reuse of a carrier and, therefore, can approach the efficiency of a TDMA implementation having a very precise common clock and highly accurate timing advances.

Additionally, CDMA transmission technology may be shared in both the powerline and optical media of the preferred embodiment HFP broadband communication networks. For example, once a CDMA chip set and/or other infrastructure is developed for the powerline side of a preferred embodiment HFP broadband communication network, this technology may be reused with respect to the fiber side of the network.

In particular implementations, it may be critical to comply with regulatory requirements and/or industry standard because any non-compliance could effectively stop system deployment. For example, the use of high frequencies in open networks raises the question of electromagnetic emission. Such emissions are typically governed by a number of different regulations. In the USA the relevant authority limits emissions to a maximum tolerable field strength of approximately 30 V/m or approximately 30 dB(V/m) within a 30-meter radius of a powerline communication (PLC) system.

Germany, where PLC technology has encountered severe opposition, imposes legal provisions with respect to electromagnetic emission. Specifically, the German legal provisions establishing a permitted threshold of 30 (NB30) limiting the field strength such that the interference field strength (peak value) is not permitted to exceed the values in the table provided below at the operating site and along the line at a distance of 3 meters from the telecommunications system or network or the connected lines. If emissions are below the limit defined by the NB30 regulation, a license is required to operate a PLC system. Other European countries are currently examining the possibility of adopting these limits.

| Frequency in MHz in the range | Interference field strength limit (peak value) at 3 m distance dB(mV/m) |
|---|---|
| 0,009 to 1 | $40 - 20 \cdot \log_{10}$ (f/MHz) |
| Greater than 1 to 30 | $40 - 8,8 \cdot \log_{10}$ (f/MHz) |
| Greater than 30 to 1000 | 27 [1] |
| Greater than 1000 to 3000 | 40 [2] |

Where:
[1] Corresponds to the equivalent emission of 20 dBpW.
[2] Corresponds to the equivalent emission of 33 dBpW.

It is expected that the NB30 regulation will be effective on Jul. 7, 2003. For more information with respect to the NB 30 regulation, the reader is directed to Deutsche Bundespost: Richtlinie fur die technische Prufung von TF Industrie-funkanlagen auf Niederspannungsleitungen (bis 380V), FTZ Guideline 446R2022, 1974, and Deutsche Bundespost: Technishe Richtlinie fur TF Funkanlagen mit einer Nutzleistung van maximal 5 mW und einer DBP-Zulassungsnummer der Kennbuchstabenreihe "TWF", FTZ Guideline 17R2040, 1985. Additionally, for information with respect to additional EMC regulatory steps being considered in Europe the reader is directed to EN59013 by Cenelec (European Committee for Electrotechnical Standardization) and Specification for radio Interference Measuring Apparatus and Measuring Methods, CISPR Publication 16, Geneva, Switzerland, 1993.

CDMA communication provides advantages with respect to the above mentioned electromagnetic emission because CDMA spreads the energy throughout the frequency band. Moreover, emissions may be controlled by reducing matching the data rate to the level of interference, thereby always allowing data communication having an acceptable electromagnetic emission level. Specifically, in CDMA if the data rate is reduced, the transmission power may be reduced a corresponding amount and, therefore, the electromagnetic emission levels may be correspondingly lowered. However, in TDMA, for example, as the data rate is reduced, the electromagnetic emissions are reduced per hertz, but the reduction is associated with only a particular portion of the spectrum. Accordingly, the remainder of the spectrum continues to be operated at the same power and having the same electromagnetic emissions associated therewith. Accordingly, when emission problems are experienced, reducing the data rate is generally not a solution in TDMA applications.

Therefore, the use of CDMA appears to be well suited for the power line environment of the preferred embodiment HFP broadband communication network. The data rate provided by a preferred embodiment CDMA implementation is expected to be 16×20 Mb/s==360 Mb/s.

Figure 7:
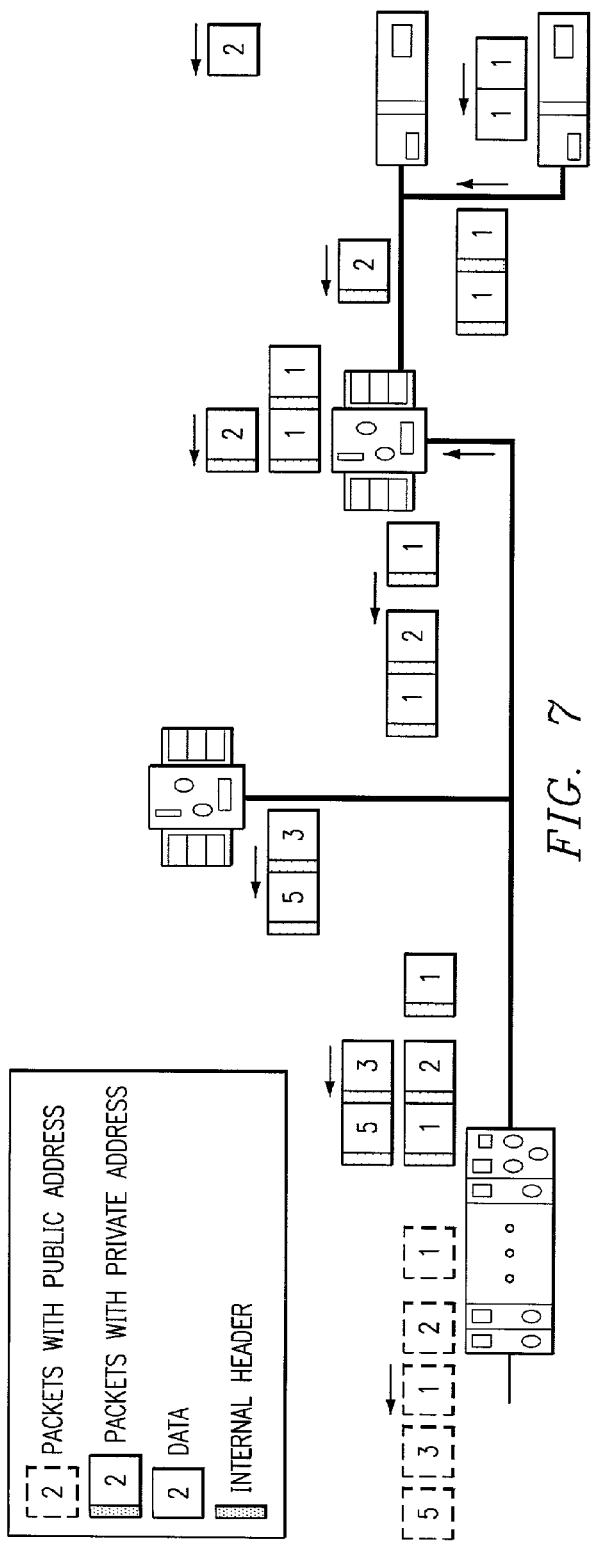
FIG. 7 shows transmission of packets in an upstream path according to a preferred embodiment of the present invention.

As illustrated in FIG. 7, the HFP portals of the preferred embodiment preferably transmit packets to its corresponding HFP hub utilizing CDMA transmission. The HFP hubs preferably organize the packets into a single stream of packet-by-packet format for transmission utilizing CDMA transmission. The optical hub preferably repeats the packet-by-packet organization to transmit the packets via the external interface to an attached system, such as a WAN or other network. The optical hub preferably removes any private address encapsulation of the packets, as described above with respect to downstream transmission, to thereby provide packets in a format readily usable by external systems. Of course, where only a single optical hub is provided with respect to upstream transmissions, embodiments of the present invention may omit the above described private address encapsulation technique, and thereby simplify upstream transmission, as all upstream packets may be presumed to be destined for the same point in the HFP broadband communication network.

However, even where a single transmission destination exists, the aforementioned private addressing may be utilized. For example, operation, administration, maintenance, and provisioning (OAM&P) signaling may be utilized wherein particular devices of the HFP broadband communication network direct communications to other such devices within the network, thereby utilizing the private addressing scheme. Of course, it is possible to implement such OAM&P messaging in the upstream even where the preferred embodiment private addressing technique is utilized only in the downstream by configuring a single point, such as the optical hub, to detect these packets in the upstream transmission and redirecting the packets as a downstream packet having the appropriate private address associated therewith. Moreover, it should be appreciated that public address schemes may be implemented to provide internal communications, such as the aforementioned OAM&P messaging, where desired. However, such an implementation is not utilized according to the preferred embodiment in order to allow for the above mentioned simplification of intermediary devices, such as the HFP hub.

As shown in FIG. 1, there are four primary system components in preferred embodiment HFP broadband communication network system, those being a management system (e.g., management network 101), optical hub (e.g., optical hub 141), HFP hub (e.g., HFP hubs 151 and 152), and HFP portal (e.g., HFP portals 121-123). The optical hub, HFP hub and HFP portal preferably provide the broadband communication connectivity from substation to subscriber site and vice versa as described herein. The capacity of a preferred embodiment HFP broadband communication network is as follows: One optical hub preferably supports up to 12 PONs; each PON preferably supports up to 8 HFP hubs; and each HFP hub preferably supports up to 126 HFP portals.

An initialization process is preferably implemented when the system or components are initially powered up and/or reset. For example, an optical hub, HFP hub, and/or HFP portal may perform steps of an initialization process when powered up for the first time, when a new component is introduced into the network, after repair, etcetera.

Each HFP device (e.g., optical hub, HFP hub, HFP portal) will preferably have an equipment identification number (EIN) associated therewith. This number may be used, according to a preferred embodiment of the invention, as the address for internal HFP message routing proposes described above. For example, this number may be utilized in the encapsulation process as a header of destination in the downstream and origination in the upstream packets. Accordingly, HFP hubs and HFP portals of the preferred embodiment will preferably accept or reject packets based on whether the EIN belongs to the service area or not.

Figure 8:
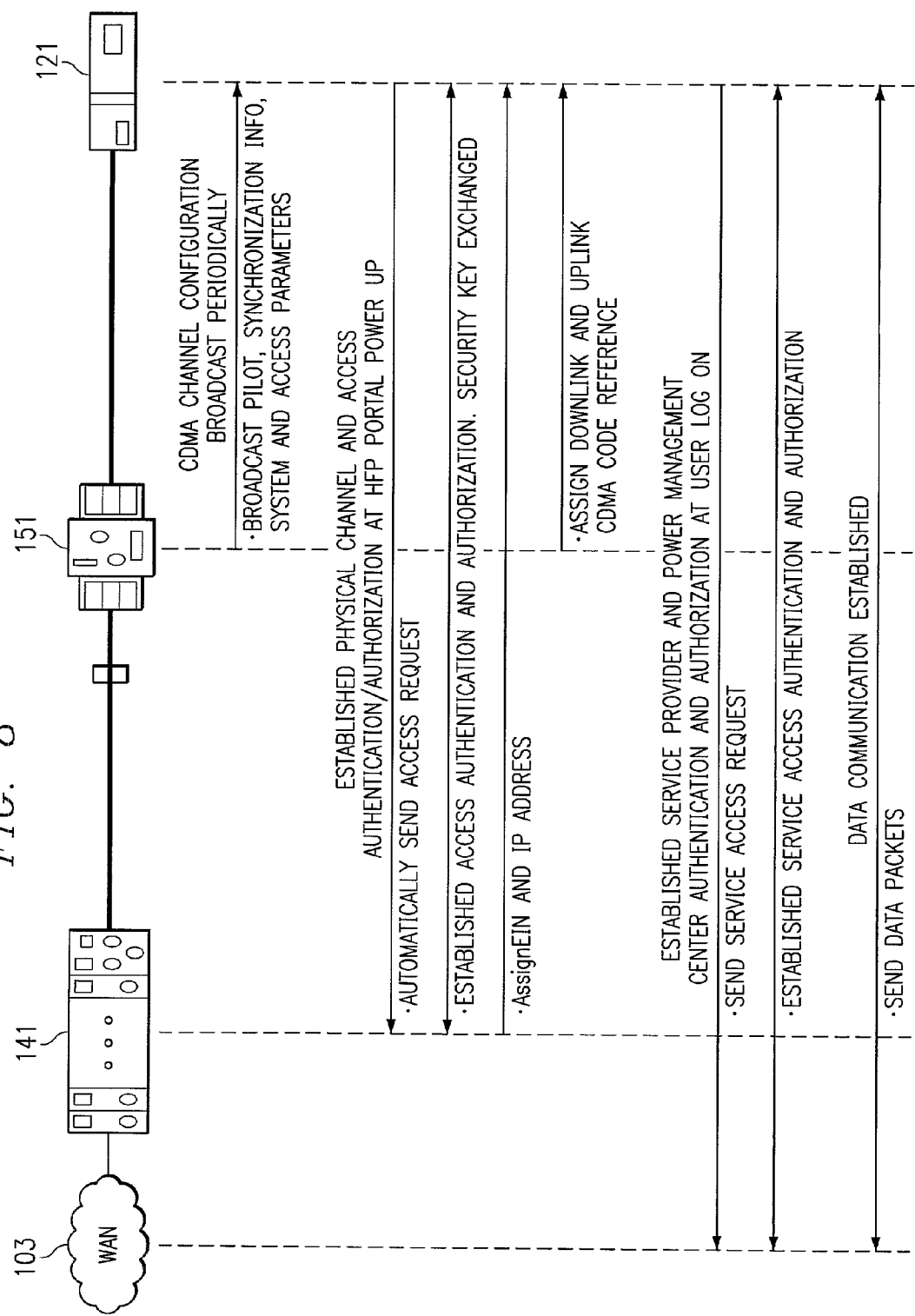
FIG. 8 shows a high level flow diagram of a preferred embodiment initialization process.

FIG. 8 shows a high level flow diagram of a preferred embodiment initialization process wherein a HFP portal obtains an EIN (preferably one time or upon network reconfiguration or other occasional event) and IP reference (preferably dynamically as needed) for establishing a connection. According to a preferred embodiment, a HFP portal EIN is assigned based upon a HFP hub coupled thereto, using such an assignment scheme facilitates hardware switching by the HFP hub as EINs of attached HFP portals are readily recognizable. Of course, other EIN assignment schemes may be utilized according to the present invention, if desired.

According to the preferred embodiment the optical hub preferably has a number of public IP addresses which may be dynamically assigned to HFP devices for establishing links with external devices. For example, IP addresses may be assigned and de-assigned (available for assignment to other devices) as subscriber communication or other demand requires. Likewise, IP addresses may be assigned (either substantially permanently or dynamically) to HFP devices, such as the optical hub, HFP hub, and HFP portal, for OAM&P functions as provided by a management network coupled thereto.

Figure 9:
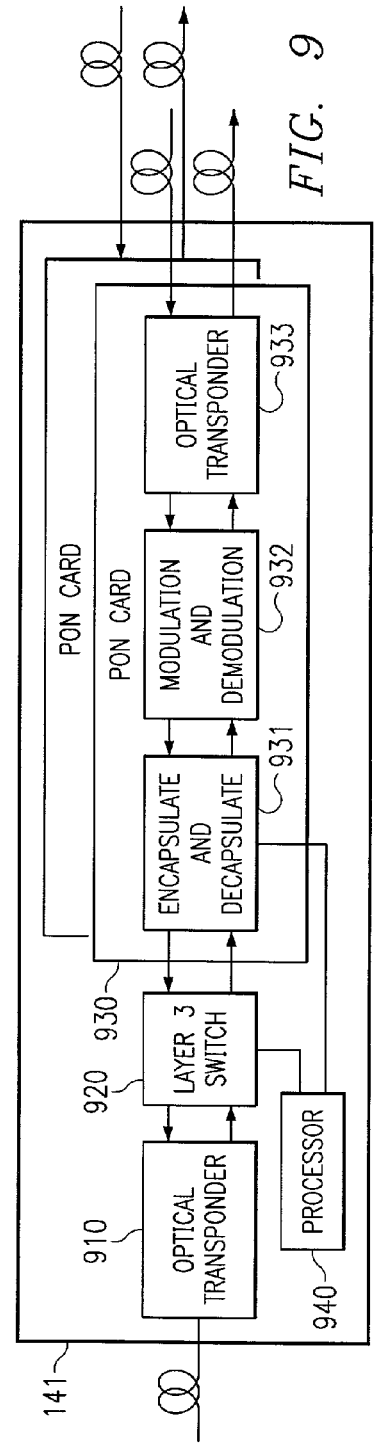
FIG. 9 shows a block diagram of a preferred embodiment optical hub of the present invention.

A block diagram of a preferred embodiment optical hub is shown in FIG. 9. The optical hub preferably serves as a gateway to the Internet or other external network and, therefore, is preferably adapted to provide the connectivity arrangement to deliver and receive messages from subscribers.

Optical hub 141 as shown in FIG. 9 preferably includes optical transponder 910 to provide a physical interface with an external optical network. For example, optical transponder 910 may be compliant with the Gigabit Ethernet standard interface with single mode fiber and provide conversion between optical signals and electrical signals. Of course, other protocols may be supported in addition to or in the alternative to the one mentioned. Moreover, physical interfaces other than an optical interface may be utilized according to the present invention.

Layer 3 switch 920, preferably a TCP/IP switch, is coupled to optical transponder 910 in the illustrated embodiment. Layer 3 switch 920 preferably provides routing functionality to the incoming and outgoing packets, as is well known in the art. For example, an incoming TCP/IP packet from an external network may be routed based on a public IP address contained therein. Any packets with a special IP address assigned to the optical hub will preferably be terminated at the optical hub, such as by routing to processor 940. Such specially addressed IP packets may be utilized for OAM&P communication to a network operation center, such as may comprise management network 101. Other public IP address messages will preferably be passed on to a PON card of optical hub 141 for transmission on the HFP broadband communication network. Conversely, outgoing TCP/IP packets will preferably be routed by layer 3 switch 920 an external network via optical transponder 910.

A routing directory utilized by layer 3 switch 920 may be created manually, such as by a system operator mapping the HFP broadband communication network and creating a routing table accordingly. However, the preferred embodiment directory is created automatically to accommodate dynamic assignment of IP addressing, such as is commonly done in Internet implementations well known in the art.

Optical hub 141 preferably includes one or more PON cards providing connectivity to remaining portions of a HFP broadband communication network of the present invention.

Preferred embodiment PON card 930 comprises encapsulator/decapsulator 931 to add a private address header to each packet transmitted on the HFP broadband communication network. As described above, the header is preferably a unique EIN. Accordingly, the internal communication between the optical hub, HFP hub, and/or HFP portal of the present invention is preferably addressed via the EIN headers. Since layer 3 switch 920 of the preferred embodiment determines the destination of the packet from the IP address, encapsulator/decapsulator 931 of the preferred embodiment coordinates with the switch to cross reference the public IP address to EIN (private address). Once the packet is encapsulated by encapsulator/decapsulator 931, the packet is preferably provided to modulator/demodulator 932.

Encapsulator/decapsulator 931 preferably provides decapsulation to remove the header from incoming packets. Once a packet is decapsulated, it is preferably provided by encapsulator/decapsulator 931 to layer 3 switch 920. and send the IP packet to the switch. If the packet has an EIN addressed to the HFP Optical HUB, then this packet will be forwarded to the processor.

Modulator/demodulator 932 preferably provides modulation of signals for transmission through a transmission media (here optic fiber) and demodulation of signals received through a transmission media (again, optic fiber), as is well known in the art. The particular modulation scheme implemented may be any of a number of schemes, such as those which may be utilized in providing OFDM, CDMA, TDMA, and combinations thereof. Signals modulated by modulator/demodulator 932 are preferably provided to optical transponder 933. Signals demodulated by modulator/demodulator 931 are preferably provided to encapsulator/decapsulator 931.

Optical transponder 933 of the preferred embodiment operates to convert between electrical and optical signals, substantially as described above with respect to optical transponder 910. Optical transponder 933 of the preferred embodiment operates at approximately 200 to 400 Mb/s. The receiver utilized in optical transponder 933 is preferably analog where CDMA protocols are utilized in the fiber portion of the HFP broadband communication network.

Having described generally the functional aspects of a preferred embodiment optical hub, attributes of a most preferred embodiment optical hub are provided in the table below. It should be appreciated, however, that the particulars of the aspects described below are merely given as an example of a configuration according to the present invention. Accordingly, variations thereof are within the scope of the invention.

| Feature | Description |
| --- | --- |
|  | Provide packet routing to HFP network and ISP/Power Management Center via Internet backbone |
| LAN Interface | 12 ports of TX/RX 1000 Base LX |
| LAN bandwidth | Downlink in PON broadcast mode up to 200 Mbps |
|  | Uplink in CDMA over PON at 200 Mbps |
| WAN Interface | Gigabit Ethernet TX/RX 1000 Base LX |
| WAN bandwidth | Full Duplex Gigabit Ethernet |
| Security | Support DES between HFP Hub and HFP Portal |
|  | Support IPsec pass through |
| Service | Support common routing protocol RIP, OSPF, IGRP, Enhanced IFRP |
|  | DHCP server |
|  | DNS server |
| Management | Configurable through web browser |
|  | Support remote loading and upgrade |

-continued

| Feature | Description |
| --- | --- |
|  | SNMP |
|  | Telnet |
| Performance and Fault Management | Alarms |
|  | Environmental Monitoring |
|  | SNMP |
|  | Testing and Self Diagnostics |
|  | Statistics gathering |

Figure 10:
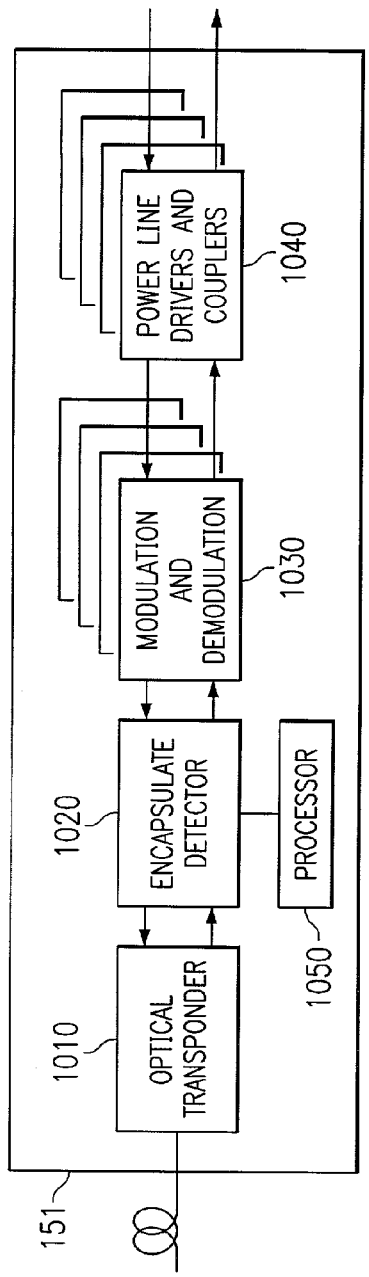
FIG. 10 shows a block diagram of a preferred embodiment HFP hub of the present invention.

A block diagram of a preferred embodiment HFP hub of the present invention is shown in FIG. 10. As described above, HFP hubs of the present invention preferably convert optical data to electrical data for transmission over powerlines and vice versa. According to a most preferred embodiment, the HFP hub is co-located with the low voltage transformer (e.g., the last transformer in a power distribution system before penetration into a subscriber site). Accordingly, the optical connection of the HFP hub may be coupled to a fiber cable that is running along a medium voltage power cable and the powerline connection is preferably made on the low voltage side of the powerline.

HFP hub 151 illustrated in FIG. 10 includes optical transponder 1010 operable to convert between optical signals and electrical signals, substantially as described above with respect to optical transponder 910. The optical signal will preferably be represented in binary, e.g., ON or OFF, in both transmit and receive paths. The data rate of a preferred embodiment is approximately 200 to 400 Mb/s.

An optical signal as received by HFP hub 151 will preferably contain all HFP hub signals. Accordingly, optical transceiver 1010 is coupled to encapsulator/decapsulator 1020 operable to select packets encapsulated with relevant a EIN and discard other packets (e.g. perform simple hardware level switching functionality). There is no selection of packets performed on the up stream according to the preferred embodiment, as all the packets will preferably be passed through encapsulator/decapsulator 1020 for transmission to the optical hub.

It should be appreciated that there are at least two types of packets according to a preferred embodiment. One such packet type includes those packets intended for the HFP hub, such as for OAM&P management purposes. These packets will preferably be detected and terminated within HFP hub 151, such as by being routed to processor 1050.

Another such packet type includes those packets intended for subscriber devices. These packets will preferably be passed on to the HFP portals coupled to HFP hub 151. Accordingly, encapsulator/decapsulator 1020 is coupled to one or more modulator/demodulator, depending upon the powerline configuration and/or the number of subscriber sites coupled thereto.

Preferred embodiment modulator/demodulator 1030 is configured substantially as described above with respect to modulator/demodulator 932. For example, modulator/demodulator 1030 may demodulate a signal as modulated by the optical hub for transmission through a fiber optic media coupling the optical hub and HFP hub 151. Additionally, the modulator/demodulator may remodulate the demodulated signal for continued transmission over the powerline coupling HFP hub 151 to an HFP portal. Of course, if a packet is directed to the HFP hub itself or is directed to a subscriber not associated with an HFP portal coupled to the HFP hub, the remodulation step may be omitted. It should be appreciated that operation in the other link direction would be substantially as described above except the modulated signal would be received from an HFP portal.

Modulation schemes used by HFP hub 151 of the preferred embodiment may be any of a number of modulation schemes as described above with respect to the optical hub. Moreover, there is no requirement that the same modulation scheme be used for the link between the optical hub and HFP hub and the link between the HFP hub and the HFP portal.

Modulator/demodulator 1030 of the preferred embodiment is coupled to powerline driver/coupler 1040. Powerline driver/coupler 1040 preferably provides amplification and filtering, to the incoming and outgoing signals. Additionally, powerline driver/coupler 1040 of the preferred embodiment provides isolation with respect to the low voltage powerline coupled thereto. Accordingly, powerline driver/coupler 1040 is a device that allows a high-speed signal to be coupled to powerline or vice versa.

Having described generally the functional aspects of a preferred embodiment HFP hub, attributes of a most preferred embodiment HFP hub are provided in the table below. It should be appreciated, however, that the particulars of the aspects described below are merely given as an example of a configuration according to the present invention. Accordingly, variations thereof are within the scope of the invention.

| Feature | Description |
| --- | --- |
|  | Provide physical layer conversion between optical PON and electrical CDMA or OFDM |
| LAN Interface | Up to 8 by 3 phase electrical connections |
| LAN bandwidth | Downlink in broadcast mode with encapsulated packets over CDMA or OFDM. Data rate of 20 Mbps |
|  | Uplink in IP packets over CDMA with 20 Mbps. |
| WAN Interface | 1000 Base SX/LX/LH |
| WAN bandwidth | Downlink in broadcast receive mode over PON at no less than 200 Mbps. |
|  | Uplink in CDMA mode over PON at 100 Mbps. |
| Security | Support DES between HFP HUB and HFB Portal |
|  | Support Ipsec pass through |
| Service | Support IP and higher layer communications |
| Management | Configurable through web browser |
|  | Support remote loading and upgrade |
|  | SNMP |
|  | Telnet |
| Performance and Fault | Alarms |
| Management | Environmental Monitoring |
|  | SNMP |
|  | Testing and Self Diagnostics |
|  | Statistics gathered for support of IEEE 802.3 LME |

Figure 11:
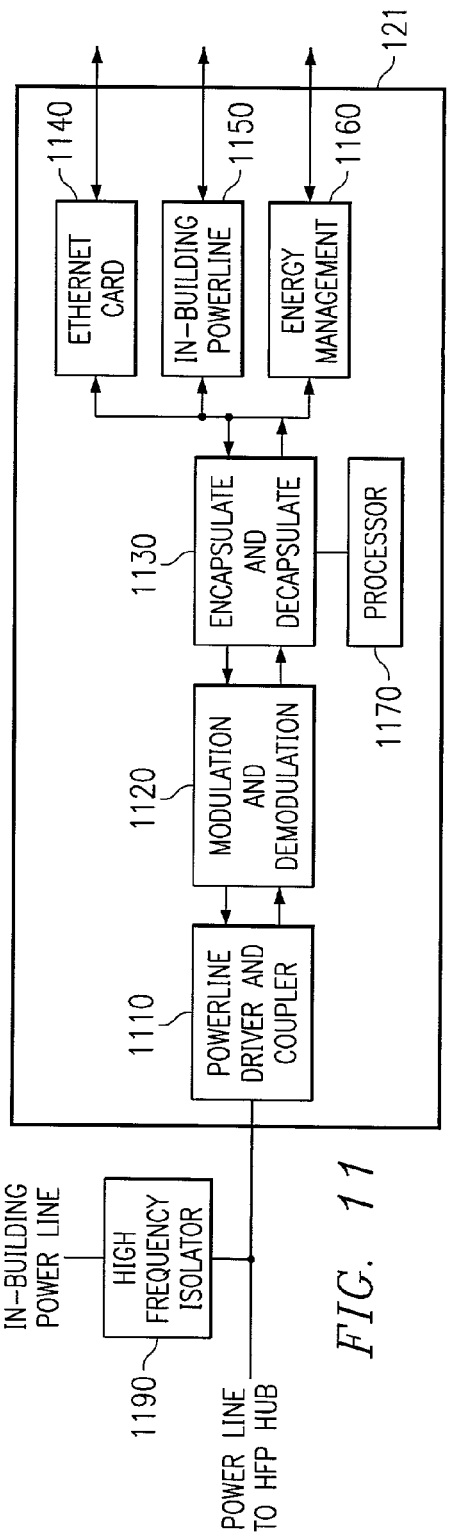
FIG. 11 shows a block diagram of a preferred embodiment HFP portal of the present invention.

A block diagram of a preferred embodiment HFP portal of the present invention is shown in FIG. 11. The HFP Portal is preferably subscriber premise equipment that provides communications between a HFP hub of the preferred embodiment and in-building networks or other subscriber devices. HFP portal 121 of the preferred embodiment acts as a data packet routing gateway from subscriber site to the outside world via a powerline coupled thereto. Accordingly, HFP portal 121 of the preferred embodiment provides multiplexing and data and networking protocol functions. HFP portal 121 also preferably provides interfaces to connect to a subscriber LAN and/or other subscriber devices. External interfaces provided by HFP portal 121 may include Ethernet ports, electrical interface for power management, iLon connections, and/or the like. Moreover, HFP portal 121 of the preferred embodiment provides DHCP and DNS client functions to obtain IP addresses as described above.

HFP portal 121 of the preferred embodiment includes powerline driver/coupler 1110 providing amplification and filtering to the incoming and outgoing signals as well as isolation with respect to the low voltage powerline coupled thereto. Accordingly, powerline driver/coupler 1110 of the preferred embodiment is substantially the same as powerline driver/coupler 1040 described above.

Modulator/demodulator 1120 is coupled to powerline driver/coupler 1110 of the preferred embodiment. Modulator/demodulator 1120 is configured substantially as described above with respect to modulator/demodulator 932 and modulator/demodulator 1030. For example, modulator/demodulator 1120 may demodulate a signal as modulated by the HFP hub for transmission through a powerline coupling the HFP hub and HFP portal 121. Additionally, the modulator/demodulator may remodulate the demodulated signal for continued transmission through an external interface coupling HFP portal 121 to a subscriber device. Of course, if a packet is directed to the HFP portal itself or is directed to different HFP portal coupled to the HFP hub, the remodulation step may be omitted. It should be appreciated that operation in the other link direction would be substantially as described above except the modulated signal would likely be received from an external interface of HFP portal 121.

Signals as received from a HFP hub will preferably be encapsulated using a private address as discussed above. Accordingly, modulator/demodulator 1120 is preferably coupled to encapsulator/decapsulator 1130 operable to select packets encapsulated with relevant a EIN and discard other packets. Upstream packets are preferably encapsulated with an appropriate EIN for transmission through the HFP broadband communication network.

It should be appreciated that the aforementioned at least two types of packets may be utilized with respect to HFP portal 121. For example, packets intended for the HFP portal, such as for OAM&P management purposes, may be detected and terminated within HFP portal 121, such as by being routed to processor 1170. Similarly, packets intended for subscriber devices may be passed through an external interface of HFP portal 121 to subscriber devices coupled thereto. Accordingly, it should be appreciated that operation of encapsulator/decapsulator 1130 is substantially the same as described above with respect to encapsulator/decapsulator 931 and encapsulator/decapsulator 1020.

The preferred embodiment of HFP portal 121 supports a number of different types of external interfaces. Accordingly, encapsulator/decapsulator 1130 may be coupled to one or more external interfaces, such as Ethernet interface 1140, in-building powerline interface 1150, and/or energy management interface 1160. These interfaces may provide for connection of various types of subscriber devices and/or various devices having different protocols to a preferred embodiment HFP broadband communication network. For example, Ethernet interface 1140 may provide for coupling subscriber data processing equipment, such as computers and computer networks, Internet appliances, and the like, and/or subscriber communication equipment, such as telephony devices, television devices, facsimile devices, and the like, to a HFP broadband communication network. In-building powerline interface 1150 may provide for coupling a variety of devices, such as in building appliance control devices utilizing protocols including LonWorks, X10, CEBus, and the like, to a HFP broadband communication network. Similarly, energy management interface 1160 may provide for coupling various load devices, such as compressor pumps, heaters, load balancing capacitors, and the like, to a HFP broadband communication network. It should be appreciated that the present invention is not limited to the use of the particular aforementioned interfaces. For example, network interfaces in addition to or other than Ethernet, such as Token Ring, may be provided, if desired. Moreover, interfaces providing connectivity different than the interfaces discussed above may be utilized. For example, an interface providing a plain old telephone (POT) type connection, a wireless interface, a RS232 serial interface, a universal serial bus (USB), and the like may be utilized according to the present invention. However, the most preferred embodiment HFP portal accommodates a plurality of such interfaces, through the use of interchangeable interface cards.

Having described generally the functional aspects of a preferred embodiment HFP portal, attributes of a most preferred embodiment HFP portal are provided in the table below. It should be appreciated, however, that the particulars of the aspects described below are merely given as an example of a configuration according to the present invention. Accordingly, variations thereof are within the scope of the invention.

| Feature | Description |
| --- | --- |
| | Provide broadband connections to ISP and Power Management Center via the Internet backbone |
| LAN Interface | Full Duplex 10/100 Base T Ethernet ports, meets IEEE 802.3 |
| | iLon ports |
| | In-building 110 VAC 3 phase electrical lines to breaker panel |
| LAN bandwidth | Full Duplex 10/100 Mbps Ethernet |
| WAN Interface | 3 phase electrical connections to outside transformer |
| WAN bandwidth | Downlink in broadcast receive mode over CDMA at 20 Mbps |
| | Uplink in CDMA mode at 20 Mbps |
| Security | Support DES between HFP HUB and HFP Portal |
| | Support IPsec pass through |
| Service | Obtain IP address from ISP through DHCP client function at Power Up |
| | Support IP and higher layer communications |
| Management | Configurable through web browser |

Although not necessarily an integral part of the preferred embodiment HFP portal, implementation of the present invention preferably includes deployment of an isolator to isolate powerline communication associated with the present invention substantially from in-building powerlines. Accordingly, isolator 1190 is shown disposed between a powerline supplying power to the site and powerlines internal to the site. Without such isolation, the in-building and the outdoor powerline are electrically connected and, therefore, communication signals or noise on the in-building powerline can leak to the outdoor powerline with very little loss and vice versa. Isolator 1190 is preferably inserted in the powerline at a point after HFP portal 121 is connected to the powerline to isolate these two parts of transmission media. Of course, other configurations of isolation may be provided, such as by passing the powerline through the HFP portal and providing an isolator therein.

The preferred embodiment isolator is a low pass filter and stop band termination that allows 50/60 Hz power through but it stops the high frequency communication signals. Accordingly, the isolation provided by isolator 1190 is preferably at frequencies of 500 kHz and above.

It should be appreciated that, in the above described preferred embodiment HFP broadband communication network system components, various modules thereof provide similar functionality. Accordingly, common modules, or portions thereof, are preferably designed for use in several components of the present invention.

Through the communication connectivity of the preferred embodiment HFP broadband communication network, various services may be provided. For example, services such as a power management service, a power network management service, and/or Internet service may be provided using the preferred embodiment HFP broadband communication network.

Internet services may be provided by HFP networks of the present invention to provide a broadband access as a wholesale market to an ISP or other carrier. The HFP infrastructure of the preferred embodiment provides an always-on and optimized high speed connection to the subscribers. Accordingly, once such subscribers are preferably authenticated and authorized by both the access and service providers, Internet services may readily be provided via the preferred embodiment HFP network. Typical Internet access services may include access authentication and authorization, assigning one or more IP address to the subscriber, DNS server, persistent Internet connection, guaranteed minimum data rates, and/or the like. Operation and management criteria provided by such an Internet service may include simple installation and provisioning, menu-driven software installation, physical connection detection and authentication prior to allowing data transmission, collection of usage information, such as for billing or planning purposes, software load and configuration through in-band and/or out-of-band channel. The basic security for the user data is preferably provided by the method of transmission in the direct sequence spread spectrum processing. Additional security such as DES may be utilized in the access network between the HFP hub and HFP portal to avoid sniffing by unintended receiver in the shared network. The subscriber is also preferably authenticated both by the Network Access Provider and the ISP. For end to end security, a subscriber may add security such as IPSEC outside of the access network.

Another service which may utilize a preferred embodiment HFP network provides network management capability (e.g. power network management service), such as to electric utility companies. For example, the preferred embodiment HFP network infrastructure allows an electric utility company to monitor the services as provided to subscribers and, therefore detect outages and/or identify network problems before outages occur or propagate. The power usage per household, or other subscriber entity, may be monitored and/or the loading managed, if required. Specifically, the preferred embodiment HFP network facilitates load management capability in which real-time monitoring or receiving of cumulative reports of the power meter readings per household is provided. Similarly, such load management may operate to provide load control, such as to control (turn on and off) the main breaker and/or individual breaker to each load, perhaps even identifying the type of load, e.g., water heater, pool pump, air conditioner compressor, etc. Preferably, operation and management criteria of such load management provides for installation and provisioning which is simple. For example, embodiments may utilize a breaker and/or breaker panel designed for retrofitting the present invention to thereby facilitate reporting, identification, and/or control functions according to a preferred embodiment.

Still another service which may utilize a preferred embodiment HFP network provides power management capability. For example, with the growing concern of the ecological impact and economic cost of inefficient utilization of resources, electric power providers and consumers are becoming more aware of the desirability to manage usage patterns. Accordingly, embodiments of the present invention may provide real time and cumulative reports and statistics of electric power usage, scheduling and control of the power to individual load, electric rate broadcast and display in customer premises, real time calculation and/or daily/monthly/yearly report on electric usage billing, alarms based on usage setting, and/or the like to facilitate more efficient use of power. Preferably, the operation and management of such a management system are relatively simple to facilitate its installation and utilization. For example, the installation and provisioning is preferably as simple as possible, such as providing any hardware installed for the subscribers with plug and play capability. Additionally, management software is preferably intuitive to operate, such as through adopting the well known WINDOWS based graphical user interface and using a menu-driven architecture. Security is preferably provided with respect to subscriber data. For example, some level of subscriber data may be provided by the aforementioned use of CDMA transmissions. Moreover, users of the system are preferably authenticated before being provided access to the network.

Having described preferred embodiments of a HFP broadband communication network above, and exemplary uses thereof, it should be appreciated that there are various power distribution configurations into which such a system may be deployed. For example, two low voltage power distribution configurations, such as may be utilized in providing penetration into subscriber sites according to the present invention, are shown in FIGS. 12 and 13. Specifically, FIG. 12 shows a single feed configuration and FIG. 13 shows a multiple feed configuration.

Figure 14:
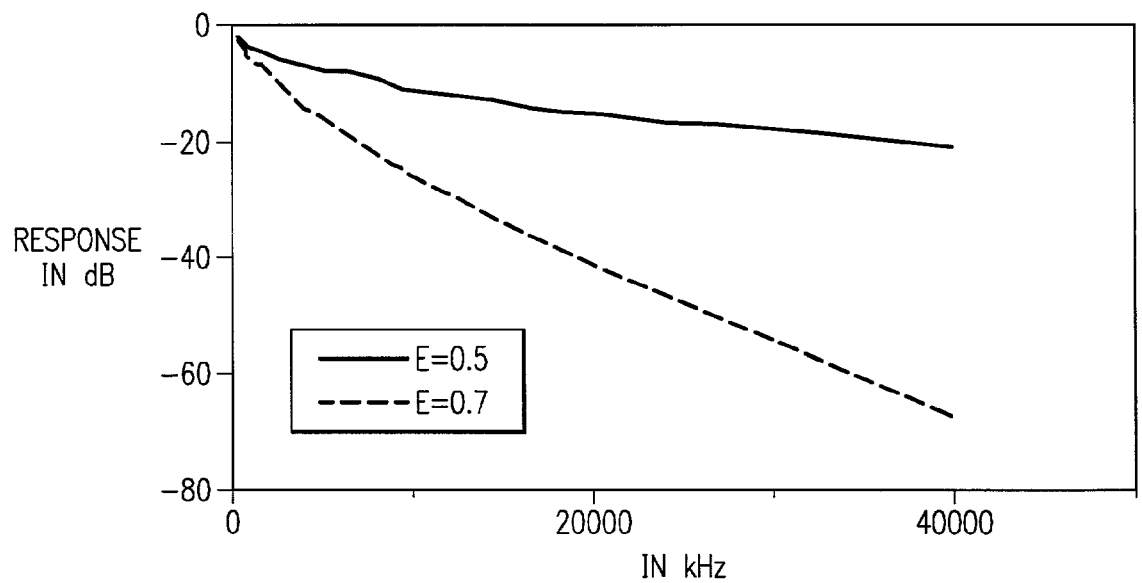
FIG. 14 shows a graph of signal attenuation associated with an exemplary powerline transmission media.

It should be appreciated that a point to point powerline configuration is a simplest configuration for providing signal communication. For example, the attenuation frequency response expression for such a point to point powerline configuration is approximately equal to:

$$A(f) = 8.686 \eta_0 l (1 + \eta_1 f^\epsilon)_{dB}$$

where $\eta_0$ is the coefficient at d.c. per foot, l is the cable length in feet, $\eta_1$ is equal to $1/f_2$, $f_2$ is the frequency when the attenuation is doubled, and $\epsilon$ (due to skin effect) is normally 0.5 to 0.7. As can be seen from FIG. 14, wherein an example where the cable loss at DC is 1 dB is shown, the loss is very much dependent on the value of $\epsilon$. In the illustrated example, the useful bandwidth, e.g. 40 dB, varies from 20 to 60 MHz. The propagation through the cable in this example is 2 ns/ft.

However, a single bridge tap, such as bridge taps 1201 of FIG. 12 and bridge taps 1301 of FIG. 13, could produce multiple echoes which complicate the channel characteristics. An expression for one bridge tap is:

$$S_o(t) = \sum_{i=1}^{N} a_i S_i(t - \tau_i)$$

where $S_o$ is the output signal, $S_i$ is the input signal, a is the amplitude, t is the time, and $\tau$ is the delay. Accordingly, an expression for a multiple bridge tap powerline is:

$$S_o(t) = \sum_{j=1}^{M} \sum_{i=1}^{N} a_{j,i} S_i(t - \tau_{j,i})$$

It can readily be appreciated from the above that the transmission characteristics of a powerline having bridge taps associated therewith are complicated to determine for any particular subscriber site. However, as discussed above, the preferred embodiment HFP broadband communication network utilizes spread spectrum CDMA techniques which mitigate or eliminate the effects of echoes associated with such bridge taps.

It should be appreciated that, although preferred embodiments of the present invention have been described herein with respect to hybrid fiber powerline broadband communication networks, the present invention is not so limited. Accordingly, various aspects of the invention may be applied for use in various communication systems, whether broadband or narrow band, and/or utilizing a variety of transmission media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A communication network system comprising:
a first transmission media providing a trunked network resource for packetized data, and further providing a branch network resource in addition to said trunked network resource;
a second transmission media providing a branched network resource for packetized data, wherein said first transmission media and said second transmission media are different, and the second transmission media is a power transmission line; and
a first hub coupling said first media and said second media and providing arbitration of communication of packetized data signals therebetween, wherein said arbitration includes transformation of the packetized data signals received via one of said first media and said second media for transmission via the other one of said first media and said second media, and wherein said packetized data signal is received via one of said first media and said second media and comprises a first multiple access format, and said packetized data signal is then transmitted via the other one of said first media and said second media in said first multiple access format;
a second hub coupled to said first hub via said first media, wherein said second hub provides an interface for coupling said trunked network resource of said first media to said branched network resource of said first media, and provides arbitration of communication between said external system and said network, wherein said arbitration provided by said second hub includes manipulation of data packets for simplified arbitration by said first hub.

2. The system of claim 1, wherein said manipulation of data packets includes encapsulating data packets received via said interface using a private address protocol.

3. The system of claim 1, wherein said second hub selects data packets received via one of said first media and said interface directed to said first hub.

4. The system of claim 1, wherein said second hub comprises:
a first optical transponder;
a data switch; and
a module for coupling said first media to said second hub.

5. The system of claim 1, wherein said data switch comprises an OSI model layer 3 switch.

6. The system of claim 4, wherein said second hub comprises a plurality of said modules thereby providing for coupling a plurality of first media links to said second hub.

7. The system of claim 4, wherein said module comprises:
a modulator/demodulator; and
a second optical transponder.

8. The system of claim 7, wherein said module further comprises:
a data encapsulator/decapsulator.

9. The system of claim 1, wherein said signal transmitted via the other one of said first media and said second media comprises a second multiple access format.

10. The system of claim 1, wherein said arbitration includes selecting data packets received via one of said first and said second media for transmission via the other one of said first and said second media, and wherein said arbitration further includes selecting data packets received via one of said first and said second media directed to said first hub.

11. The system of claim 1, further comprising:
a portal coupled to said first hub via said second media, wherein said portal provides a second interface for coupling an external system to said network.

12. The system of claim 11, wherein said external system comprises a metro network.

13. The system of claim 11, wherein said external system comprises a data network.

14. The system of claim 11, wherein said external system comprises a management network.

15. The system of claim 11, wherein said external system comprises an Internet service provider point of presence.

16. The system of claim 11, wherein said external system comprises a network operations center.

17. The system of claim 11, wherein said external system comprises a network.

18. The system of claim 11, wherein said external system comprises subscriber site equipment.

19. The system of claim 18, wherein said subscriber site equipment comprises a power meter.

20. The system of claim 18, wherein said subscriber site equipment comprises a power load balancing device.

21. The system of claim 18, wherein said subscriber site equipment comprises a power load device.

22. The system of claim 18, wherein said subscriber site equipment comprises a computer system.

23. The system of claim 18, wherein said subscriber site equipment comprises a telephony system.

24. The system of claim 11, wherein said portal comprises a plurality of said external interface modules thereby providing for coupling a plurality of external systems to said network.

25. The communication network system of claim 1, further comprising at least one portal, said portal connecting said branched resource of said second transmission media to end user equipment and operable to recognize packetized data signals on said second transmission media intended for said end user equipment.

26. A communication network system comprising:
a first transmission media providing a trunked network resource for packetized data, and further providing a branch network resource in addition to said trunked network resource;
a second transmission media providing a branched network resource for packetized data, wherein said first transmission media and said second transmission media are different, and the second transmission media is a power transmission line; and
a first hub coupling said first media and said second media and providing arbitration of communication of packetized data signals therebetween, wherein said arbitration includes transformation of the packetized data signals received via one of said first media and said second media for transmission via the other one of said first media and said second media, and wherein said packetized data signal is received via one of said first media and said second media and comprises a first multiple access format, and said packetized data signal is then transmitted via the other one of said first media and said second media in said first multiple access format;
a portal coupled to said first hub via said second media, wherein said portal provides a second interface for coupling an external system to said network, and provides arbitration of communication between said external system and said network, wherein said arbitration provided by said portal includes manipulation of data packets for simplified arbitration by said first hub.

27. The system of claim 26, wherein said manipulation of data packets includes encapsulating data packets received via said interface using a private address protocol.

28. The system of claim 26, wherein said portal selects data packets received via one of said second media and said interface directed to said portal.

29. An integrated broadband communication network system comprising:
a first transmission media providing a trunked network resource, and further providing a branch network resource in addition to said trunked network resource;
a second transmission media providing a branched network resource, wherein said first transmission media and said second transmission media are different, and the second transmission media is a power transmission line;
a first hub coupling said first media and said second media and providing arbitration of communication therebetween, said communication utilizing a modulation scheme which is consistent across the first and second transmission media, wherein said arbitration includes selecting particular data packets received via one of said first and said second media for transmission via the other one of said first and said second media;
a second hub coupled to said first hub via said first media, wherein said second hub provides an interface for coupling said trunked network resource of said first media to said branched network resource of said first media, wherein said second hub provides arbitration of communication between said trunked network resource of said first media to said branched network resource of said first media, wherein said arbitration provided by said second hub includes manipulation of data packets for simplified arbitration by said first hub; and a portal coupled to said first hub via said second media, wherein said portal provides a second interface for coupling a second external system to said network.

30. The system of claim 29, wherein said second transmission media comprises a power transmission line.

31. The system of claim 30, wherein said first transmission media comprises a fiber optic media.

32. The system of claim 29, wherein a signal comprising said particular data packets received via one of said first media and said second media comprises a CDMA signal format.

33. The system of claim 29, wherein a signal comprising said particular data packets received via said one of said first media and said second media comprises a TDMA signal format.

34. The system of claim 29, wherein a signal comprising said particular data packets received via said one of said first media and said second media comprises a FDMA signal format.

35. The system of claim 29, wherein said arbitration includes transformation of signals received via one of said first media and said second media for transmission via the other one of said first media and said second media.

36. The system of claim 29, wherein said first interface comprises an interface adapted for communication using a widely accepted standardized protocol.

37. The system of claim 29, wherein said manipulation of data packets includes encapsulating data packets received via said first interface using a private address protocol.

38. The system of claim 29, wherein said second interface comprises an interface adapted for communication using a widely accepted standardized protocol.

39. The system of claim 29, wherein said portal provides arbitration of communication between said second external system and said network, wherein said arbitration provided by said portal includes manipulation of data packets for simplified arbitration by said first hub.

40. The system of claim 39, wherein said manipulation of data packets includes encapsulating data packets received via said second interface using a private address protocol.

41. A method of providing broadband communication, said method comprising:

coupling a fiber optic transmission media to a power line media using a first hub;

coupling said power line media to an external device using a portal, wherein said portal provides a standardized interface for coupling to said external device;

encapsulating publicly addressed data packets using a private address scheme; and transmitting said encapsulated data packets through said fiber optic transmission media and said power line media in a digital format, wherein said hub bridges transmission of said encapsulated data packets between said fiber optic transmission media and said power line media, and wherein a second hub and said portal cooperate to encapsulate and decapsulate said data packet to thereby allow said first hub to controllably pass said data packet using a hardware switch implementation.

42. The method of claim 41, further comprising:

coupling said fiber optic transmission media to a plurality of power line media using corresponding hubs configured as said first hub.

43. The method of claim 41, wherein said private address scheme utilizes unique address information associated with a network device.

44. The method of claim 43, wherein said unique address information comprises an equipment identification number.

45. The method of claim 41, further comprising:

coupling said fiber optic transmission media to an external system using a second hub, wherein said second hub provides a standardized interface for coupling to said external system, and wherein said publicly addressed data packets are addressed according to a protocol utilized by said standardized interface.

46. The method of claim 45, further comprising:

coupling said second hub to a plurality of fiber optic transmission media, wherein each such fiber optic transmission media is coupled to a different power line media using hubs configured as said first hub.

47. The method of claim 41, wherein said fiber optic transmission media is coupled to said power line media at a point in a power distribution system on a subscriber side of a last voltage transformer thereof.

* * * * *